United States Patent
Norimatsu et al.

(10) Patent No.: US 8,360,649 B2
(45) Date of Patent: Jan. 29, 2013

(54) WHEEL BEARING APPARATUS INCORPORATED WITH A WHEEL SPEED DETECTING APPARATUS

(75) Inventors: Takayuki Norimatsu, Iwata (JP); Yujiro Ono, Iwata (JP); Hiroshi Kawamura, Iwata (JP)

(73) Assignee: NTN Corporation, Osaka-shi (JP)

( * ) Notice: Subject to any disclaimer, the term of this patent is extended or adjusted under 35 U.S.C. 154(b) by 367 days.

(21) Appl. No.: 12/618,982

(22) Filed: Nov. 16, 2009

(65) Prior Publication Data
US 2010/0124389 A1    May 20, 2010

Related U.S. Application Data

(63) Continuation of application No. PCT/JP2008/001225, filed on May 16, 2008.

(30) Foreign Application Priority Data

| May 16, 2007 | (JP) | 2007-130146 |
| May 16, 2007 | (JP) | 2007-130147 |
| May 16, 2007 | (JP) | 2007-130148 |
| May 16, 2007 | (JP) | 2007-130149 |
| May 16, 2007 | (JP) | 2007-130150 |
| Jun. 5, 2007 | (JP) | 2007-149066 |
| Jun. 19, 2007 | (JP) | 2007-161477 |

(51) Int. Cl.
*F16C 33/76* (2006.01)
*F16C 41/00* (2006.01)

(52) U.S. Cl. ........................ 384/448; 384/489
(58) Field of Classification Search .................. 384/448, 384/477, 478, 480, 484, 486, 488, 489; 277/317, 277/349, 351, 423, 429, 563
See application file for complete search history.

(56) References Cited

U.S. PATENT DOCUMENTS

| 2002/0018606 A1* | 2/2002 | Toda et al. ..................... 384/448 |
| 2006/0213288 A1* | 9/2006 | Suzuki ..................... 73/862.321 |
| 2007/0076993 A1* | 4/2007 | Koyagi ..................... 384/448 |

FOREIGN PATENT DOCUMENTS

| JP | 62-68024 | 4/1987 |
| JP | 09-105758 | 4/1997 |
| JP | 2002-362106 | 12/2002 |
| JP | 2005-076747 | 3/2005 |
| JP | 2005-098387 | 4/2005 |
| JP | 2005-133772 | 5/2005 |
| JP | 2005-140187 | 6/2005 |
| JP | 2005-140188 | 6/2005 |
| JP | 2005-140320 | 6/2005 |
| JP | 2006-029529 | 2/2006 |
| JP | 2006-183701 | 7/2006 |
| JP | 2006-183712 | 7/2006 |
| JP | 2006-291977 | 10/2006 |
| WO | WO2006/038521 | 4/2006 |

* cited by examiner

*Primary Examiner* — Phillip A Johnson
(74) *Attorney, Agent, or Firm* — Harness, Dickey & Pierce, P.L.C.

(57) ABSTRACT

A wheel bearing apparatus incorporating a wheel speed detecting apparatus has a wheel bearing with an outer member and an inner member. A sensor holder is injection molded from synthetic resin and is embedded with a wheel speed detecting sensor. The sensor holder is mounted on an inner side end of the outer member. The inner side seal of the seals includes an annular sealing plate, a slinger and a pulser ring. An anchoring portion is formed integrally with the metal core. The sensor holder is being integrally molded with the metal core from synthetic resin that surrounds the anchoring portion.

25 Claims, 11 Drawing Sheets

(a)　　　　　　　(b)

(a)    (b)

(a)          (b)

US 8,360,649 B2

WHEEL BEARING APPARATUS INCORPORATED WITH A WHEEL SPEED DETECTING APPARATUS

CROSS-REFERENCE TO RELATED APPLICATIONS

This application is a continuation of International Application No. PCT/JP2008/001225, filed May 16, 2008, which claims priority to Japanese Application Nos. 2007-130146, filed May 16, 2007; 2007-130147, filed May 16, 2007; 2007-130148, filed May 16, 2007; 2007-130149, filed May 16, 2007; 2007-130150, filed May 16, 2007; 2007-149066, filed Jun. 5, 2007; and 2007-161477, filed Jun. 19, 2007. The disclosures of the above applications are incorporated herein by reference.

FIELD

The present disclosure relates to a wheel bearing apparatus incorporating a wheel speed detecting apparatus to detect a rotation speed of a wheel of a vehicle.

BACKGROUND

A wheel bearing apparatus that supports a wheel of a vehicle relative to a suspension apparatus and that incorporates a wheel speed detecting apparatus to detect a rotational speed of a wheel of a vehicle to control the anti-lock braking system (ABS) is generally known. Such a bearing apparatus generally includes a sealing apparatus between an inner member and an outer member. The inner and outer members are rotatable relatively to each other via rolling elements (balls) between the two. A magnetic encoder has alternately arranged magnetic poles along its circumference and is integrated into the sealing apparatus. A wheel speed detecting sensor detects the variation in magnetic poles of the magnetic encoder according to the rotation of the wheel.

The wheel speed sensor is usually mounted on a knuckle after the wheel bearing apparatus is mounted on the knuckle to form a suspension apparatus. Recently, however, a wheel bearing apparatus incorporating a wheel speed detecting apparatus has been proposed where the wheel speed detecting sensor is self-contained within the wheel bearing. This reduces the size of the wheel bearing apparatus as well as eliminates troublesome in air gap adjustment between the wheel speed sensor and the magnetic encoder.

An example of a prior art wheel bearing apparatus incorporating a wheel speed detecting apparatus is shown in FIG. 15. This wheel bearing apparatus incorporating a wheel speed detecting apparatus 100 includes an outer member 101, an inner member 103, inserted into the outer member via double row balls 102, and a wheel speed detecting apparatus 104, mounted on one end of the outer member.

The outer member 101 is integrally formed with a body mounting flange on its outer circumference. The body mounting flange 101b is to be mounted on a knuckle (not shown) to form a portion of a suspension of a vehicle. The outer member inner circumference includes double row outer raceway surfaces 101a, 101a.

The inner member 103 includes a wheel hub 105 and an inner ring 106 secured on the wheel hub 105. The wheel hub 105 is formed at one end with a wheel mounting flange 107 to mount a wheel (not shown). The wheel hub outer circumference has one inner raceway surface 105a that oppose one of the double row outer raceway surfaces 101a, 101a. A cylindrical portion 105b extends from the inner raceway surface 105a. The inner ring 106 is formed with the other inner raceway surfaces 106a on its outer circumference. The other inner raceway surface 106a opposes the other of the double row outer raceway surfaces 101a, 101a. The inner ring 106 is press-fit onto the cylindrical portion 105b of the wheel hub 105 via a predetermined interface.

Double row balls 102, 102 are contained between the double row outer raceway surfaces 101a, 101a and the inner raceway surface 105a, 106a, respectively, of the wheel hub 105 and the inner ring 106. The balls 102, 102 are rollably held by cages 108, 108. In addition, seals 109, 110 are mounted in annular openings formed between the outer member 101 and the inner member 103. The seals 109, 110 prevent leakage of grease contained in the bearing and entry of rainwater or dusts from the outside.

The wheel speed detecting apparatus 104, as shown in FIG. 16, includes a sensor holder 112 with an embedded magnetic sensor 111 and a seal 110. The sensor holder 112 is insert-molded to a metal core 115 forming the seal 110 by injection molding of synthetic resin.

The seal 110 is formed by a combination of a first seal ring 113 and a second seal ring 114. The first seal ring 113 includes a metal core 115, formed of a rigid ring, and a sealing member 116 mounted on the metal core 115. The metal core 115 has a cylindrical portion 115a to be fit into the end of the outer member 101. An outer flange portion 115b extends radially inward from the cylindrical portion 115a. A cylindrical portion 115c, that prevents entry of water, extends axially toward the inner side from the flange portion. An inner flange portion 115d extends radially inward from the cylindrical portion 115c. A sealing member 116 is adhered on the inner circumference of the inner flange portion 115d.

The second seal ring 114 includes a slinger 117, with a substantially L shaped cross-section, mounted onto the inner ring 106, and a pulser ring 118, fit onto the slinger 117. The slinger 117 has a cylindrical portion 117a press-fit onto a smaller diameter portion 106b of the inner ring 106. A flange portion 117b extends radially outward from the cylindrical portion 117a. An elastic seal 119 is mounted on the cylindrical portion 117a of the slinger 117. The elastic seal 119 has an axial lip 119a in sliding contact with the end face of the inner ring 106.

The pulser ring 118 includes an annular supporting member 120 and a magnetized member 121. The supporting member 120 has a smaller cylindrical portion 120a press-fit onto the cylindrical portion 117a of the slinger 117. A connecting portion 120b extends radially outward from the smaller cylindrical portion 120a. A larger cylindrical portion 120c, extending from the connecting portion 120b, is fit onto the larger diameter portion 106c of the inner ring 106. The magnetized member 121 is adhered to the larger cylindrical portion 120c. The magnetized member 121 is made of rubber or synthetic resin mingled with magnetic powder. N and S poles are alternately arranged along the magnetized member 121. The magnetized member 121 is arranged opposite to the magnetic sensor 111 so that it does not contact the cylindrical portion 115c of the metal core 115.

The sealing member 116 includes a side lip 116a, a pair of radial lips 116b, 116c and a side lip 116d. The side lip 116a of the slinger side slidingly contacts the flange portion 117b of the slinger 117. The pair of radial lips 116b, 116c slidingly contacts the smaller cylindrical portion 120a of the supporting member 120. The side lip 116d of the pulser side slidingly contacts the connecting portion 120b of the supporting member 120.

The sensor holder 112 is arranged opposite to the end face of the outer member 101. An annular recess 122 is formed to expose a portion of the cylindrical portion 115a of the metal core 115. O ring 123 is elastically mounted within the recess 122. A disc shaped cover 124, formed with an aperture having a diameter smaller than that of the slinger 117, is mounted on the inner side end face of the sensor holder 112.

The entire structure including the O ring 123 of the wheel speed detecting apparatus 104 can be previously assembled by first combining the first seal ring 113 and the pulser ring 118. The supporting member 120 of the pulser ring 118 is then press fit onto the slinger 117. This sub-assembly is axially pushed so that the cylindrical portion 115a of the metal core 115 is fit into the outer member 101. The cylindrical portion 117a of the slinger 117 is simultaneously press-fit onto the smaller diameter portion 106b of the inner ring 106. Such a structure makes it possible to prevent separation between the metal core 115 and the sensor holder 112 as well as the entry of water from the interface between the metal core 115 and the sensor holder 112. Reference Patent Document: No. 183701/2006.

However, in the prior art wheel bearing apparatus 100 incorporating a wheel speed detecting apparatus 104, it is believed that the synthetic resin insert molded sensor holder 112 would separate from the metal core 115 that forms the first seal ring 113 when the wheel bearing apparatus is used under severe running circumstances such as subjected to splashes of muddy water or salty water or repeated high or low temperature. The separation between the metal core 115 and the sensor holder 112 causes variation in the air gap between the magnetic sensor 111 and the magnetized member 121. Thus, this makes exact speed detection impossible.

Also in the prior art wheel bearing apparatus 100, even though the wheel speed detecting apparatus 104 is protected by the disc shaped cover 124 mounted on the sensor holder 112 and the detecting portion is sealed by the seal 110, it is believed that muddy water will solidify on the slide contacting portion of the seal 110. This causes abnormal wear of the sealing member 116 when muddy water enters over the disc shaped cover 124 and dwells in the seal 110. This detracts from the sealing performance. Thus, it is difficult to assure the reliability of the bearing for a long term.

In addition in the prior art wheel bearing apparatus 100, the sensor holder 112 is displaced from the outer member 101 when it is used under conditions where shock or vibration is applied to the apparatus 100. This would not only detract from the sealability of the fitting portions and the seal 110 but makes exact detection of the wheel speed impossible. The sensor holder 112 with the metal core 115 is fit into the outer member 101. The metal core is in with metal-to-metal contact. Thus, the fitting strength will be increased by improving the surface roughness and dimensional accuracy of the fitting portion. However improvement of the surface roughness and dimensional accuracy of the fitting portion also increases the number of manufacturing steps and management steps and thus reduces the cost effectiveness.

In the prior art wheel bearing apparatus 100, a connector portion 112a, for a harness (not shown) connecting the magnetic sensor 111 and a control means (not shown) mounted on a body of the vehicle, is integrally molded with the annular sensor holder 112 at a lower portion. Thus, output signals from the magnetic sensor 111 are sent to the control means by connecting a plug of the harness to the connector portion 112a.

During mounting of the wheel bearing apparatus 100 to a vehicle after the wheel speed detecting apparatus 104 has been mounted on the outer member 101, the wheel bearing apparatus 100 might be erroneously handled and hung from the connector portion via the harness. It is believed that such a handling of the wheel bearing apparatus 100 would cause the plug to be dislodged from the connector 112a. Additionally, the antilock braking system could not operate normally. Further, the sensor holder 112 would be dislodged from the outer member 101 if the metal core 115 mounted on the outer member 101 is displaced.

Finally in the prior art wheel bearing apparatus 100, the magnetic sensor 111 and the magnetized member 121 are oppositely arranged via the cylindrical portion 115c of the metal core 115. Thus, it is difficult to obtain high detecting accuracy and reliability. The detecting accuracy and reliability are detracted by the presence of the metal core between the magnetic sensor and the magnetized member.

SUMMARY

Therefore, it is an object of the present disclosure to provide a wheel bearing apparatus incorporating a wheel speed detecting apparatus that improves adhessiveness or integration between the plastic resin sensor holder and the metal core and prevents detraction of the detecting accuracy caused by separation between the sensor holder and the metal core. Another object is to assure sealability and improve the reliability of the wheel bearing apparatus.

A further object is to assure the anti-pull out force of the connecting portion of harness and the sensor holder mounted on the outer member, to improve the sealability of the fitting portions and the seal, and to improve the detecting accuracy and reliability.

A wheel bearing apparatus incorporating a wheel speed detecting apparatus comprises an outer member integrally formed with a body mounting flange on its outer circumference. The body mounting flange is to be mounted on a suspension apparatus of a vehicle. The outer member inner circumference has double row outer raceway surfaces. An inner member includes a wheel hub and at least one inner ring. The wheel hub has an integrally formed wheel mounting flange at one end. The wheel hub outer circumference includes an inner raceway surface opposing one of the outer raceway surfaces. A cylindrical portion axially extends from the inner raceway surface. The inner ring is fit onto the cylindrical portion of the wheel hub. The inner ring is formed with the other inner raceway surface on its outer circumference. The other inner raceway surface is arranged opposite to the double row outer raceway surfaces. Double row rolling elements are freely rollably contained between the inner and outer raceway surfaces, respectively, of the inner member and the outer member. Seals are mounted in annular openings formed between the outer member and the inner member. A sensor holder is mounted on an inner side end of the outer member. The sensor holder is injection molded of synthetic resin and has an embedded wheel speed detecting sensor. The inner side seal of the seals includes an annular sealing plate, a slinger and a pulser ring. The slinger has a substantially L-shaped cross-section and is mounted onto the outer circumference of the inner ring. The pulser ring is fit onto the outer circumference of the slinger. The pulser ring has a magnetic encoder with circumferential characteristics that alternately and equidistantly change. The sealing plate includes a metal core press formed from a steel plate. The sealing plate is insert-molded into the sensor holder. An exposed portion of the metal core is fit into the end portion of the outer member. A sealing member is integrally bonded to the metal core. The sealing member has integrally formed side lips and radial lips. The side lips of the sealing member are in sliding contact with the slinger and/or the pulser ring. The magnetic encoder and a wheel speed sensor are arranged opposite to each other via a radial gap. An anchoring portion is integrally formed with the metal core. The sensor holder is integrally molded with the metal core with synthetic resin forming the sensor holder surrounding the anchoring portion.

Seals are mounted in annular openings formed between the outer member and the inner member. A sensor holder, injection molded from synthetic resin and embedded with a wheel speed detecting sensor, is mounted on an inner side end of the outer member. The inner side seal of the seals includes an annular sealing plate, a slinger and a pulser ring. The slinger has a substantially L-shaped cross-section and is mounted onto the outer circumference of the inner ring. The pulser ring is fit onto the outer circumference of the slinger and has a magnetic encoder. The magnetic encoder circumferential characteristics alternately and equidistantly change. The sealing plate includes a metal core press formed from a steel plate. The sealing plate is insert-molded into the sensor holder. An exposed portion of the metal core is fit into the end portion of the outer member. A sealing member is integrally bonded to the metal core. The sealing member has integrally formed side lips and radial lips. The side lips of the sealing member are in sliding contact with the slinger and/or the pulser ring. The magnetic encoder and a wheel speed sensor are arranged opposite to each other via a radial gap. An anchoring portion is integrally formed with the metal core. The sensor holder is integrally molded with the metal core with synthetic resin forming the sensor holder surrounding the anchoring portion. Thus, it is possible to assure the adhessiveness or integration between the plastic resin sensor holder and the metal core even though the wheel bearing apparatus is used under severe running circumstances subjected to splashes of muddy water or salty water or repeated high temperatures and low temperatures. Accordingly, it is possible to provide a wheel bearing apparatus incorporating a wheel speed detecting apparatus that can prevent separation between the plastic resin sensor holder and the metal core for long term and also prevent detraction of the detecting accuracy caused by the separation between the sensor holder and the metal core.

The metal core includes an outer cylindrical portion press-fit into the end portion of the outer member. A standing portion extends radially inward from the outer cylindrical portion. An inner cylindrical portion axially extends toward the inner side. A radially inner portion extends radially inward from the inner cylindrical portion. The sealing member is integrally adhered to the radially inner portion. The anchoring portion is a tongue formed by folding an end portion of the outer cylindrical portion radially outward.

The anchoring portion is a circular aperture formed in the metal core. A plurality of the circular aperture are formed in the outer cylindrical portion of the metal core along its circumference. A plurality of the circular aperture may be formed in the standing portion of the metal core along its circumference. Furthermore, a plurality of the circular aperture may be formed in the inner cylindrical portion of the metal core along its circumference.

The inner ring is formed with a smaller diameter portion and a larger diameter portion. A cylindrical portion of the slinger is press-fit onto the smaller diameter portion of the inner ring. The pulser ring includes a supporting member and the magnetic encoder. The supporting member is press-formed from a ferromagnetic steel plate. The supporting member includes an inner cylindrical portion press-fit onto the cylindrical portion of the slinger. A standing portion extends radially outward from the inner cylindrical portion. An outer cylindrical portion extends from the standing portion. The outer cylindrical portion has a slightly larger diameter than the larger diameter portion of the inner ring. The magnetic encoder is adhered to the outer cylindrical portion of the supporting member. The magnetic encoder is formed from an elastomer mingled with magnetic powder and has N and S poles alternately arranged along its circumference. The magnetic encoder is arranged opposite to the wheel speed sensor via a radial gap relative to the inner cylindrical portion of the metal core without contacting it. This makes it possible to assure stable detecting accuracy with the signals being strengthened by the ferromagnetic supporting member. Additionally, the pulser ring is prevented from being soiled by rainwater or dusts.

The metal core is made of austenitic stainless steel. This improves the detecting accuracy without exerting undesirable effects onto the detecting sensitivity of the wheel speed sensor.

The supporting member is press-formed from ferromagnetic steel plate. The magnetic encoder is formed from an elastomer mingled with magnetic powder. The magnetic encoder has N and S poles alternately arranged along its circumference. This makes it possible to assure stable detecting accuracy while the signals are strengthened by the ferromagnetic supporting member.

A disc shaped cover is arranged at the inner side of the sensor holder. The inner circumference of the disc shaped cover is arranged opposite to the outer circumference of the shoulder of an outer joint member, via a small radial gap, to form a labyrinth seal. Drains are formed on or near the inner circumference of the disc shaped cover. This prevents entry of muddy water by the disc shaped cover even though the wheel bearing apparatus is used under severe circumstances, such as muddy water splashes. The cover enables discharge through the drain once muddy water has entered. Accordingly, it is possible to prevent the generation of solidification of muddy water on the slide-contacting portion of the seal. Thus, abnormal wear of the sealing member is prevented so that sealability and reliability of the bearing apparatus can be assured for a long term.

The drains are circular apertures formed equidistantly along the inner circumference of the disc shaped cover. Alternatively, the drains are notches formed equidistantly along the inner circumference of the disc shaped cover. The drains formed as circular apertures or notches can prevent solidification of muddy water on the outer circumference of the shoulder of the outer joint member.

A diameter $\phi A$ of the inner circumference of the disc shaped cover is set within a range of $\phi B + D \leqq \phi A \leqq \phi C - D$; wherein $\phi B$ is an outer diameter of the shoulder of the outer joint member; $\phi C$ is an outer diameter of the slinger; and D is an axial gap between the disc shaped cover and the slinger. This prevents entry of muddy water by the disc shaped cover even though the wheel bearing apparatus is used under severe circumstances, such as muddy water splashes. Thus, this assures desirable sealability and speed detection for a long term.

The shoulder is abutted against a larger end face of the inner ring. The outer diameter of the shoulder is set smaller than that of the inner ring. An elastic lip is integrally adhered to the slinger and contacts the end face of the inner ring. This prevents rainwater or muddy water from entering inside of the wheel bearing apparatus through fitting portions between the slinger and the inner ring.

The slinger and the disc shaped cover are press-formed from a steel plate that has preserving ability. This assures stable sealability for a long term.

The minimum anti-pull out force of the sensor holder relative to the outer member is defined by a formula Fmin=m×a; wherein "m" is mass of the sensor holder; and "a" is a vibration acceleration. The anti-pull out force of the sensor holder is set at Fmin or more. This assures the anti-pull out force of the sensor holder, to improve the sealability of the fitting portions and the seal, and to improve the accuracy detection and reliability.

A connector portion is integrally formed with a portion of the sensor holder to mount a harness connecting a control mechanism mounted on a body of a vehicle. An output signal from the magnet sensor can be sent to the control means via a plug inserted into the connector portion. The anti-pull out force of the sensor holder relative to the connector portion and the plug and relative to the outer member is set larger than the self-weight of the wheel bearing apparatus. During mounting of the wheel bearing apparatus to a vehicle, after the sensor holder has been mounted on the outer member, even though the wheel bearing apparatus might be erroneously handled and hung from the connector portion via the harness, the plug will never drop off from the connector portion. Thus, this improves the sealability of the fitting portions and the seal and improves the accuracy detection and reliability.

The connector portion is formed with a locking projection projecting axially from the wheel bearing apparatus. The locking projection is formed with an inclination tapered toward a plug inserting direction. Thus, the locking projection can be fit into a recess formed in the plug and locked therein. This simplifies assembling works of the wheel bearing apparatus and assures the anti-pull out force of the connector portion and the plug.

The fitting interface between the outer member and the metal core can be adjusted, based on the anti-pull out force of the sensor holder. This makes it possible to obtain a desirable fitting force without strictly controlling the surface roughness and dimension accuracy and suppresses an increase in machining and management steps.

The metal core includes an outer cylindrical portion press-fit into the end portion of the outer member. A standing portion extends radially inward from the inner side end of the outer cylindrical portion. An inner cylindrical portion axially extends toward the outer side from the standing portion. A radially inner portion extends radially inward from the inner cylindrical portion. The sensor holder is integrated with the metal core. It is insert molded in a region including the outer cylindrical portion, the standing portion and the inner cylindrical portion. The sealing member is adhered to the radially inner portion and arranged with being retracted to the inner side from the detecting portion of the wheel speed sensor. This makes it possible to arrange the detecting portion of the wheel speed sensor and the magnetic encoder so that they are magnetically directly opposed toward each other without interposing any steel metal core between the two. Accordingly, it is possible to set the air gap between them as small as possible and thus improve the detecting accuracy and reliability.

The magnetic encoder is formed from an elastomer such as rubber mingled with magnetic powder. The magnetic encoder has N and S poles alternately arranged along its circumference. The wheel speed sensor includes a magnetic detecting element, varying its characteristics in accordance with the flow direction of the magnetic flux, and an IC. The IC is incorporated, via a lead wire, with a wave forming circuit for rectifying the output wave form of the magnetic detecting element. An aperture, allowing passage of the lead wire, is formed in the outer cylindrical portion of the metal core. This makes it possible to connect the magnetic detecting element and the IC at a minimum distance without the necessity of wiring the leads by passing the metal core. Thus, this improves the reliability of the wheel speed sensor.

A plurality of the apertures are formed in the outer cylindrical portion of the metal core. This makes it possible to efficiently perform the wiring operation. Also, it assures the integrality between the resin sensor holder and the metal core. Thus, this prevents separation of the insert molded sensor holder from the metal core even though the wheel bearing apparatus is used under severe circumstances, such as splashes of muddy or salty water or repeat high and low temperatures.

The sensor holder is formed of non-magnetic synthetic resin. This further improves the detecting accuracy and reliability of the wheel speed sensor.

An annular groove is formed on the inner circumferential surface at the inner side end of the outer member. A radially outwardly deformed engaging portion is formed at the outer side end of the outer cylindrical portion of the metal core so that it is fit into the annular groove. This prevents displacement of the metal core relative to the outer member even though vibration or shock is applied to the wheel bearing apparatus during running of a vehicle. Thus, this prevents relative displacement of the detecting portions to maintain stable detecting accuracy for a long term.

The wheel bearing apparatus incorporating a wheel speed detecting apparatus comprises an outer member integrally formed with a body mounting flange on its outer circumference. The body mounting flange is to be mounted on a suspension apparatus of a vehicle. The outer member inner circumference includes double row outer raceway surfaces. An inner member includes a wheel hub and at least one inner ring. The wheel hub has at one end, an integrally formed wheel mounting flange. The wheel hub outer circumference includes an inner raceway surface. A cylindrical portion axially extends from the inner raceway surface. The inner ring is fit onto the cylindrical portion of the wheel hub. The inner ring is formed with the other inner raceway surface on its outer circumference. The inner raceway surfaces are arranged opposite to the double row outer raceway surfaces. Double row rolling elements are freely rollably contained between the inner and outer raceway surfaces, respectively, of the inner member and the outer member. Seals are mounted in annular openings formed between the outer member and the inner member. A sensor holder is injection molded from synthetic resin and includes an embedded wheel speed detecting sensor. The sensor holder is mounted on an inner side end of the outer member. The inner side seal of the seals includes an annular sealing plate, a slinger and a pulser ring. The slinger has a substantially L-shaped cross-section and is mounted onto the outer circumference of the inner ring. The pulser ring is fit onto the outer circumference of the slinger. The pulser ring has a magnetic encoder. The magnetic encoder circumferential characteristics alternately and equidistantly change. The sealing plate includes a metal core press formed from a steel plate. The sealing plate is insert-molded into the sensor holder and has an exposed portion of the metal core fit into the end portion of the outer member. A sealing member is integrally bonded to the metal core. The sealing member has integrally formed side lips and radial lips. The side lips of the sealing member are in sliding contact with the slinger and/or the pulser ring. The magnetic encoder and a wheel speed sensor are arranged opposite to each other via a radial gap. An anchoring portion is integrally formed with the metal core. The sensor holder is integrally molded with the metal core. Synthetic resin, forming the sensor holder, surrounds the anchoring portion. Thus, it is possible to assure the adhessiveness or integration between the plastic resin sensor holder and the metal core even though the wheel bearing apparatus is used under severe running circumstances subjected to splashes of muddy water or salty water or repeated high and low temperatures. Accordingly, it is possible to provide a wheel bearing apparatus incorporating a wheel speed detecting apparatus that prevents separation between the plastic resin sensor holder and the metal core for a long term. Also, it prevents detraction of the detecting accuracy caused by the separation between the sensor holder and the metal core.

A wheel bearing apparatus incorporating a wheel speed detecting apparatus comprises an outer member integrally formed with a body mounting flange on its outer circumference. The body mounting flange is to be mounted on a suspension apparatus of a vehicle. The outer member inner circumference has double row outer raceway surfaces. An inner member includes a wheel hub and an inner ring. The wheel hub has, at one end, an integrally formed wheel mounting flange. The wheel hub outer circumference includes an inner raceway surface. A cylindrical portion axially extends from the inner raceway surface. The inner ring is fit onto the cylindrical portion of the wheel hub. The inner ring is formed with the other inner raceway surface on its outer circumference. The other inner raceway surface is arranged opposite to the double row outer raceway surfaces. Double row rolling elements are freely rollably contained between the inner and outer raceway surfaces, respectively, of the inner member and the outer member. Seals are mounted in annular openings formed between the outer member and the inner member. A sensor holder is injection molded from synthetic resin and has an embedded wheel speed detecting sensor. The sensor holder is mounted on an inner side end of the outer member. The inner side seal of the seals includes an annular sealing plate, a slinger and a pulser ring. The slinger has a substantially L-shaped cross-section and is mounted onto the outer circumference of the inner ring. The pulser ring is fit onto the outer circumference of the slinger. The sealing plate includes a metal core press formed from a steel plate. The sealing plate is insert-molded into the sensor holder. The sealing plate has an outer cylindrical portion with an exposed portion fit into the end portion of the outer portion. A standing portion extends radially inward from the outer cylindrical portion. An inner cylindrical portion axially extends toward the inner side. A radially inner portion extends radially inward from the inner cylindrical portion. A sealing member is integrally bonded to the metal core. The sealing member has integrally formed side lips and radial lips. The slinger includes a cylindrical portion press-fit onto a smaller diameter portion of the inner ring. A standing portion extends radially outward from the cylindrical portion. The pulser ring is press-fit onto the cylindrical portion of the slinger. The magnetic encoder is adhered to the outer cylindrical portion of the pulser ring. The magnetic encoder is formed from an elastomer mingled with magnetic powder. The encoder has N and S poles alternately arranged along its circumference. The encoder is arranged opposite to the wheel speed sensor via a radial gap relative to the inner cylindrical portion of the metal core without contacting it. The side lips of the sealing member are in sliding-contact with the slinger. The radial lips are in contact with the pulser ring. A radially outwardly deformed anchoring portion, including a tongue, is formed at the outer side end of the outer cylindrical portion of the metal core. Synthetic resin, forming the sensor holder, is molded so that it surrounds the anchoring portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Preferred embodiments of the present disclosure will be hereinafter described with reference to the drawings.

Figure 1:
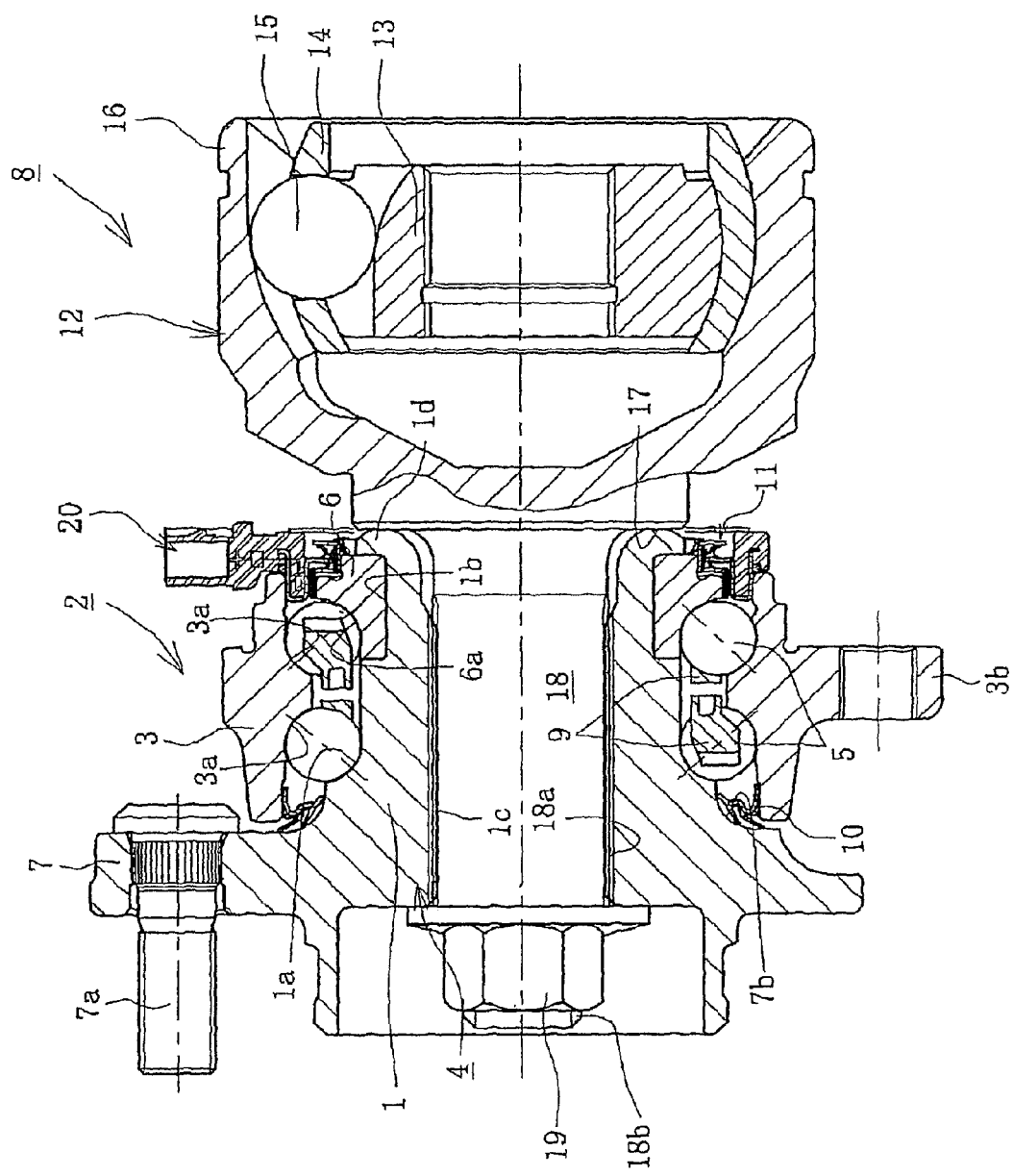
FIG. 1 is a longitudinal section view of a first embodiment of a wheel bearing apparatus incorporating a wheel speed detecting apparatus.
Figure 2:
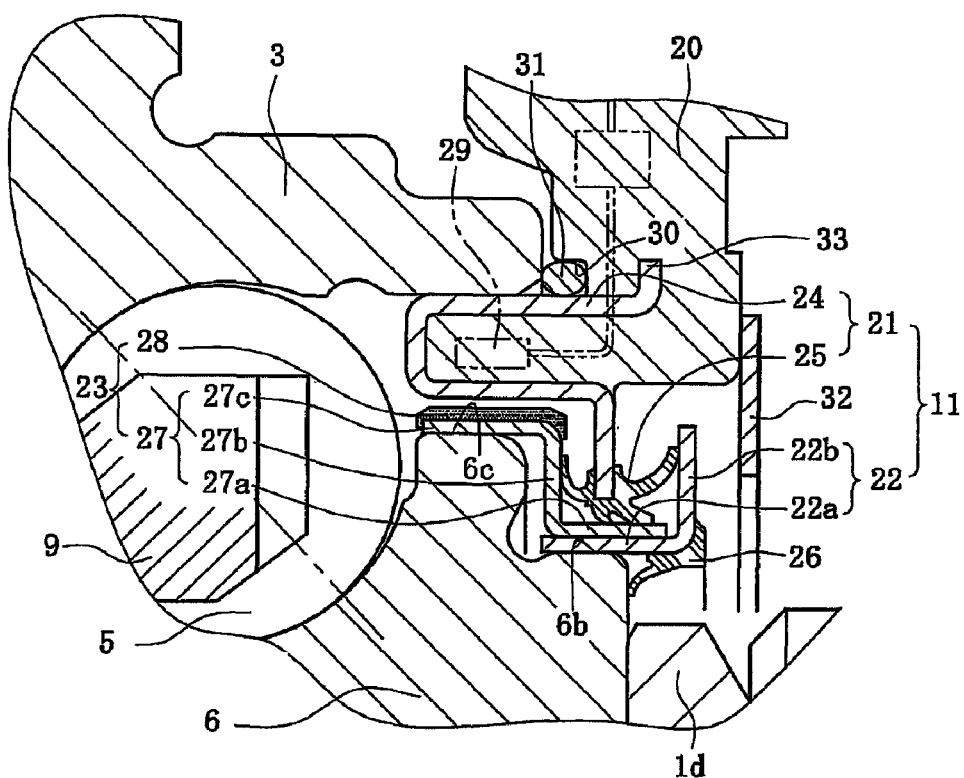
FIG. 2 is a partially enlarged view of FIG. 1.
Figure 3:
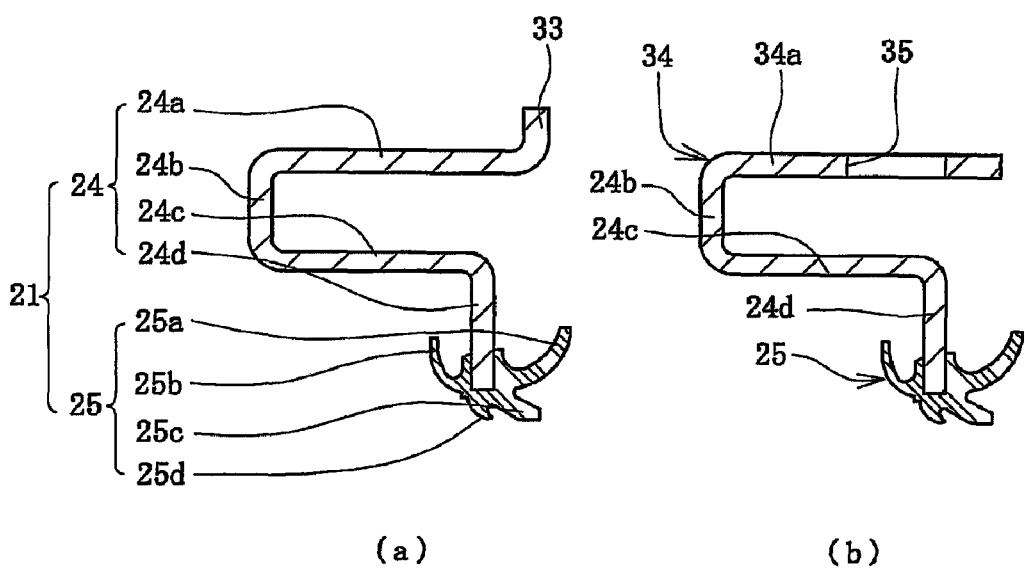
FIG. 3(a) is a cross-sectional view of a sealing plate.
FIG. 3(b) is a cross-sectional view of a modification of FIG. 3(a).

FIG. 1 is a longitudinal section view of a first embodiment of a wheel bearing apparatus incorporating a wheel speed detecting apparatus. FIG. 2 is a partially enlarged view of FIG. 1. FIG. 3(a) is a cross-sectional view of a sealing plate. FIG. 3(b) is a cross-sectional view of a modification of FIG. 3(a). In the description below, an outer side of a wheel bearing apparatus when it is mounted on a vehicle is referred to as the "outer side" (a left side in FIG. 1) and an inner side of a wheel bearing apparatus is referred to as the "inner side" (a right side in FIG. 1).

The wheel bearing apparatus incorporating a wheel speed detecting apparatus is a third generation type for a driving wheel. It is formed as a unit of a wheel hub 1, a double row rolling bearing 2 and a constant velocity universal joint 8. The double row rolling bearing 2 includes an outer member 3, an inner member 4 and double row rolling elements (balls) 5, 5.

The outer member 3 is made of medium/high carbon steel including carbon of 0.40~0.80% by weight such as S53C. It is formed on its outer circumference with a body mounting flange 3b that is to be mounted on a knuckle (not shown) to form a suspension apparatus of a vehicle. Its inner circumference includes double row outer raceway surfaces 3a, 3a. The double row outer raceway surfaces 3a, 3a are hardened by high frequency induction quenching to have a surface hardness of 58~64 HRC.

The inner member 4 includes the wheel hub 1 and an inner ring 6 secured on the wheel hub 1. The wheel hub 1 is integrally formed with a wheel mounting flange 7 at one end. The wheel hub outer circumference includes one (outer side) inner raceway surface 1a that opposes the double row outer raceway surfaces 3a, 3a. A cylindrical portion 1b extends from the inner raceway surface 1a. The wheel hub inner circumference includes a serration (or spline) 1c for torque transmission. Hub bolts 7a are equidistantly arranged on the wheel mounting flange 7 along its periphery.

The wheel hub 1 is made of medium/high carbon steel including carbon of 0.40~80% by weight such as S53C. The wheel hub 1 is hardened by high frequency induction quenching. The inner raceway surface 1a and a region from a base 7b of the wheel mounting flange 7, forming a seal land for the outer side seal 10, including the inner raceway surface 1a to the cylindrical portion 1b has a hardness of 58~64 HRC. A caulking portion 1d, described later, is not quenched and remains as is having a surface hardness after forging.

The inner ring 6 is formed on its outer circumference with another (inner side) inner raceway surface 6a corresponding to the other (i.e. inner side) outer raceway surface 3a. The inner ring 6 is fit onto the cylindrical portion 1b, via a predetermined interface. The inner ring 6 is axially secured relative to the wheel hub 1 by the caulked portion 1d. The caulked portion 1d is formed by plastically deforming the end of the cylindrical portion 1b radially outward. The inner ring 6 and the rolling elements 5 are made of high carbon chrome steel such as SUJ2. They are hardened to their core by dip quenching to have a surface hardness of 58~64 HRC.

The double row rolling elements 5, 5 are contained between the double row outer raceway surfaces 3a, 3a of the outer member 3 and the inner raceway surface 1a of the wheel hub 1 and the inner raceway surface 6a of the inner ring 6. The inner raceway surfaces 1a, 6a opposes the double row outer raceway surfaces 3a, 3a. The rolling elements are rollably held by cages 9, 9. An end face of a smaller diameter side of the inner ring 6 abuts against a shoulder of the wheel hub 1 and forms a double row angular contact ball bearing of a so-called back-to-back duplex bearing type. Seals 10, 11 are mounted in annular openings formed between the outer member 3 and the inner member 4 to prevent leakage of lubricating grease sealed in the bearing and the entry of rainwater or dusts into the bearing from the outside.

The constant velocity universal joint 8 includes an outer joint member 12, a joint inner ring 13, a cage 14 and torque transmitting balls 15. The outer joint member 12 is integrally formed by a cup-shaped mouth portion 16, a shoulder 17, that forms a bottom of the mouth portion 16, and a shaft portion 18 that axially extends from the shoulder 17. The shaft portion 18 is formed with a serration (or spline) 18 on its outer circumference. The serration (or spline) 18a engages the serration 1c of the wheel hub 1. An outer screw thread 18b is on the end of the serration 18a. The outer joint member 12 is inserted into the wheel hub via the serrations 1c, 18a until the end face of the caulked portion 1d abuts shoulder 17 of the outer joint member 12. Accordingly, the wheel hub 1 and the outer joint member 12 can be torque transmittably and detachably united by a securing nut 19.

A sensor holder 20, forming part of the wheel speed detecting apparatus, is mounted on the inner side end of the outer member 3. The inner side seal 11 is mounted in an annular opening formed between the sensor holder 20 and the inner ring 6. As shown in FIG. 2, the seal 11 includes an annular sealing plate 21, having a substantially L-shaped cross-section, and a slinger 22. The sealing plate 21 and slinger 22 are arranged opposite to each other. A pulser ring 23 is fit onto the slinger 22.

The sealing plate 21 includes a metal core 24 and a sealing member 25 integrally bonded to the metal core 24, via vulcanized adhesion. The metal core 24 is press-formed from an austenitic stainless steel sheet (JIS SUS 304 etc.) or a preserved cold rolled sheet (JIS SPCC etc.). As shown in FIG. 3(a), the metal core 24 includes an outer cylindrical portion 24a, a standing portion 24b, an inner cylindrical portion 24c, and a radially inner portion 24d. The inner cylindrical portion 24c extends axially from the outer cylindrical portion 24a via the standing portion 24b. The radially inner portion 24d extends radially inward from the inner cylindrical portion 24c. The outer cylindrical portion 24a is formed to project from the end of the outer member 3. A sensor holder 20, described below, is insert molded with the outer cylindrical portion 24a and integrated with the metal core 24. The metal core 24 is preferably made of an austenitic stainless steel sheet. Thus, it does not have undesirable effects on the detecting sensitivity of a wheel speed sensor 29, described below.

The sealing member 25 is formed of elastic member such as synthetic rubber. It is integrally adhered to the radially inner portion 24d of the metal core via vulcanized adhesion. The sealing member 25 includes side lips 25a, 25b and a pair of radial lips 25c, 25d. The side lips 25a, 25b extend on either side of the radially inner portion 24d of the metal core 24. The pair of radial lips 25c, 25d is arranged on an inner circumference of the radially inner portion 24d.

The slinger 22 is press-formed from an austenitic stainless steel sheet (JIS SUS 304 etc.) or a preserved cold rolled sheet (JIS SPCC etc.). The slinger includes a cylindrical portion 22a and a standing portion 22b. The cylindrical portion 22a is fit onto a smaller diameter portion of the inner ring 6. The standing portion 22b extends radially outward from the cylindrical portion 22a. An elastic lip 26 is integrally adhered to the slinger 22. The elastic lip 26 is in sliding-contact with the end face of the inner ring 6. The elastic lip 26 prevents entry of liquid such as rainwater into the inside of the bearing apparatus.

The pulser ring 23 includes a supporting member 27 and a magnetic encoder 28. The supporting member 27 is press-fit onto the slinger 22. The magnetic encoder 28 is integrally bonded to the outer cylindrical portion of the supporting member 27 via vulcanized adhesion. The supporting member 27 is press-formed from a ferromagnetic steel plate such as ferritic stainless steel sheet (JIS SUS 430 etc.) or preserved cold rolled sheet (JIS SPCC etc.). The supporting member 27 includes a radially inner portion 27a, a standing portion 27b and an outer cylindrical portion 27c. The radially inner portion 27a is press-fit onto the cylindrical portion 22a of the slinger 22. The standing portion 27b extends radially outward from the radially inner portion 27a. The outer cylindrical portion 27c axially extends from the standing portion 27b toward the outer side direction. The outer cylindrical portion 27c has a slightly larger diameter than that of the larger diameter portion 6c of the inner ring 6. The side lips 25a, 25b of the sealing member 25 are in sliding-contact with the standing portions 22b, 27b, respectively, of the slinger 22 and the supporting member 27. The pair of radial lips 25c, 25d are in sliding-contact with the cylindrical portion 27a of the sealing member 27.

The magnetic encoder 28 is a rubber magnet formed from an elastomer mingled with magnetic powder such as ferrite. It is constructed as a rotary encoder to detect wheel speed. It has N and S poles alternately arranged along its circumference. The magnetic encoder 28 is arranged opposite to the wheel speed sensor 29, via a radial gap (air gap) relative to the inner cylindrical portion 24c of the metal core 24 without contacting it. This enables detecting sensitivity in cooperation with the ferromagnetic supporting member 27 to assure stable detecting accuracy. In addition, such a structure of the seal 11 improves sealability and prevents the pulser ring 23 from being soiled by rainwater or dusts.

The sensor holder 20 is made of non-magnetic resin such as polyphenylene sulfide (PPS). A wheel speed detecting sensor 29 is embedded in the resin. The sensor 29 is adapted to be arranged opposite to the magnetic encoder 28, via a predetermined radial air gap. The wheel speed sensor 29 includes a magnetic detecting element, such as a Hall element, a magnetic resistance element (MR element) etc. for changing characteristics in accordance with the flowing direction of magnetic flux, and an IC. The IC is incorporated with a waveform shaping circuit to shape the output waveform of the magnetic detecting element. This enables wheel speed detection at low cost and high reliability. The sensor holder 20 may be formed of injection moldable synthetic resin e.g. PA (polyamide) 66 or polybutylene terephthalate (PBT) other than PPS.

The sensor holder 20 is arranged opposite to the end face of the outer member 3 via a slight axial gap. The sensor holder 20 includes an annular recess 30 so as to expose a portion of the outer circumference of the outer cylindrical portion 24a of the metal core 24. An O-ring 31 is elastically mounted within the recess 30. A disc shaped cover 32 is mounted on the inner side end face of the sensor holder 20. The cover 32 includes a central aperture having a smaller diameter than an outer diameter of the slinger 22.

The entire structure of the wheel speed detecting apparatus, including the O-ring 31, can be previously assembled by press-fitting the slinger 22 into the supporting member 27 of the pulser ring 23 after the sealing plate 21 and the pulser ring 23 have been combined. The outer cylindrical portion 24a of the metal core 24 can be fit into the end of the outer member 3. The cylindrical portion 22a of the slinger 22 can be press-fit onto the smaller diameter portion 6b of the inner ring 6, by axially pushing the entire previously prepared assembly.

Although it is shown in the illustrated embodiment as an active type wheel speed detecting apparatus including the magnetic encoder 28 and the wheel speed sensor 29, with magnetic detecting elements such as Hall effect elements, it is possible to use a passive type wheel speed detecting apparatus including a magnetic encoder, a magnet, annular coil etc.

An anchoring portion 33 is formed on the outer cylindrical portion 24a of the metal core 24 forming the sealing plate 21. In this embodiment, the anchoring portion 33 is formed as a tongue. It is formed by radially outwardly bending the end portion of the outer cylindrical portion 24a. Thus, it is possible to assure the adhessiveness or integration between the plastic resin sensor holder and the metal core even though the wheel bearing apparatus is used under severe running circumstances subjected to splashes of muddy water, salty water or repeated high and low temperatures. Accordingly, it is possible to provide a wheel bearing apparatus incorporating a wheel speed detecting apparatus that prevents separation between the sensor holder 20 and the metal core 24 for a long term. Also, it prevents detraction of the detecting accuracy caused by the separation between the sensor holder 20 and the metal core 24.

The anchoring portion of the metal core 24 is not limited to the anchoring portion 33 shown in FIGS. 2 and 3(a). It can be formed as a circular aperture 35 shown in FIG. 3(b). Similarly to the metal core 24 previously described, this metal core 34 is press-formed of an austenitic stainless steel sheet (JIS SUS 304 etc.) or a preserved cold rolled sheet (JIS SPCC etc.). It has an outer cylindrical portion 34a, a standing portion 24, an inner cylindrical portion 24c and a radially inner portion 24d. The outer cylindrical portion 34a is fit into the end portion of the outer member 3. The inner cylindrical portion 24c extends axially from the outer cylindrical portion 34a via a standing portion 24b. The radially inner portion 24d extends radially inward from the inner cylindrical portion 24c. The outer cylindrical portion 34a is formed to project from the end of the outer member 3. A sensor holder 20 is insert molded with the outer cylindrical portion 34a to be integrated with the metal core 34. A plurality of circular apertures 35 are formed along the circumferential direction of the outer cylindrical portion 34a. Synthetic resin, forming the sensor holder 20, flows in the apertures 35 of the metal core 34. Thus, it is possible to surely prevent separation of the sensor holder 20 and the metal core 34 for a long term.

Figure 4:
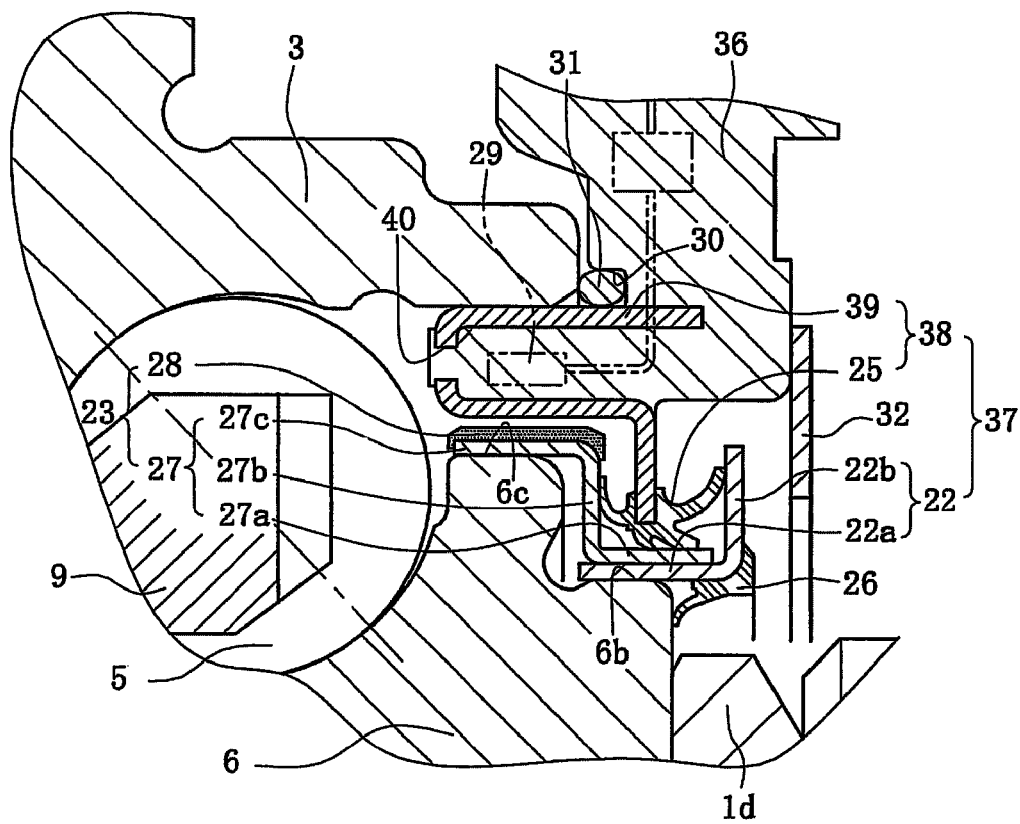
FIG. 4 is a partially enlarged view of a second embodiment of a wheel bearing apparatus incorporating a wheel speed detecting apparatus.
Figure 5:
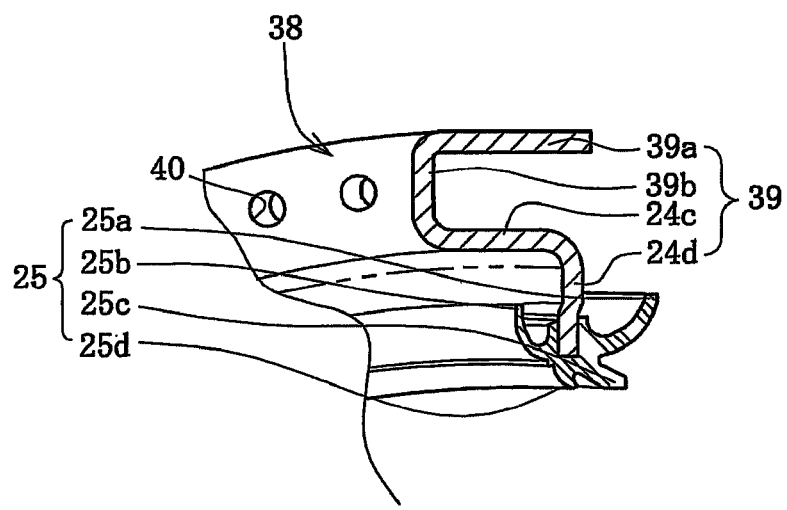
FIG. 5 is a cross-sectional view of a sealing plate of FIG. 4.
Figure 6:
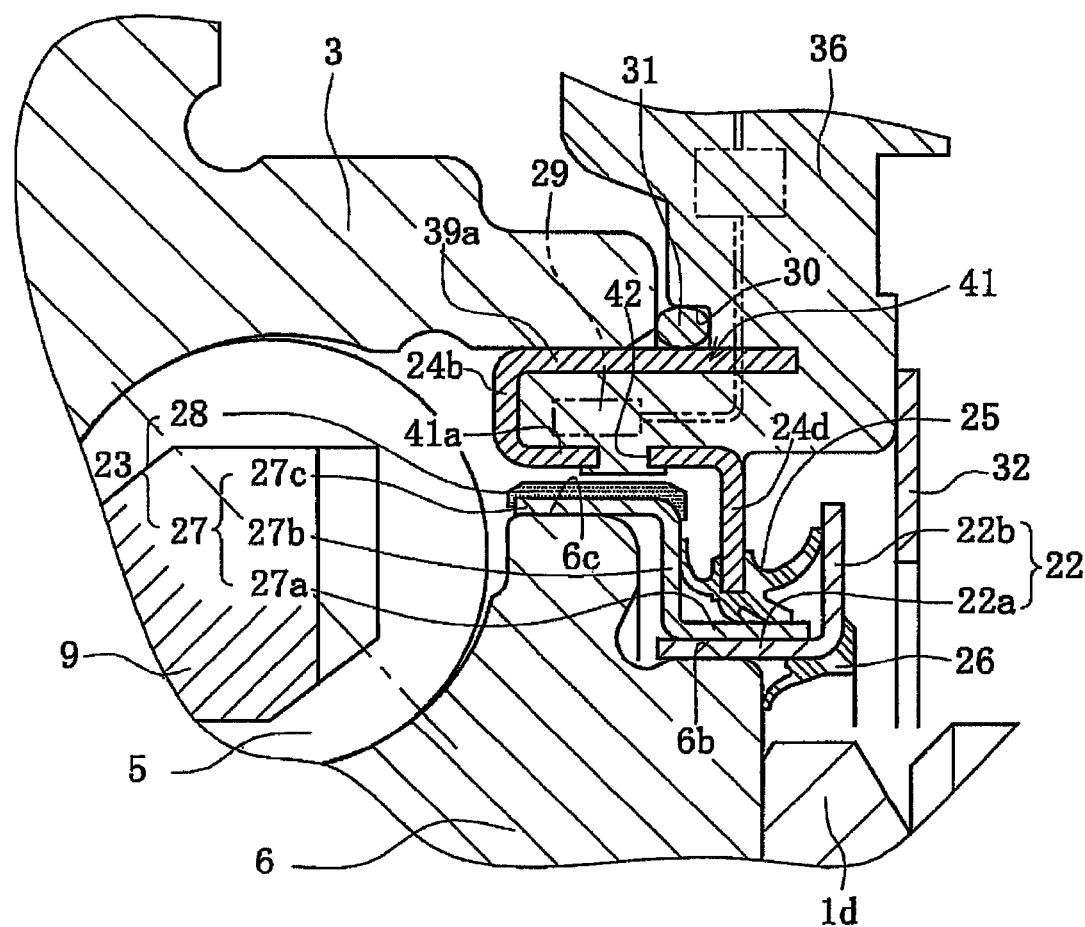
FIG. 6 is a partially enlarged view of a modification of FIG. 4.

FIG. 4 is a partially enlarged view of a second embodiment of a wheel bearing apparatus incorporating a wheel speed detecting apparatus. FIG. 5 is cross-sectional view of a sealing plate of FIG. 4. FIG. 6 is a partially enlarged view of a modification of FIG. 4. This embodiment is different from the first embodiment (FIG. 2) only in a structure of the metal core. Accordingly, the same reference numerals are used in this embodiment to identify parts or portions having the same functions as those of the first embodiment.

A sensor holder 36 is mounted on the inner side end of the outer member 3. The inner side seal 37 is mounted in an annular opening formed between the sensor holder 36 and the inner ring 6. The seal 37 includes an annular sealing plate 38, having a substantially L-shaped cross-section, and a slinger 22. The plate 38 and slinger 22 are arranged opposite to each other. A pulser ring 23 is fit onto the slinger 22.

The sealing plate 38 includes a metal core 39 and a sealing member 25 integrally bonded to the metal core 39 via vulcanized adhesion. The metal core 39 is press-formed of an austenitic stainless steel sheet (JIS SUS 304 etc.) or a preserved cold rolled sheet (JIS SPCC etc.). As shown in FIG. 5, the metal core 39 includes an outer cylindrical portion 39a, an inner cylindrical portion 24c, a standing portion 24b and a radially inner portion 24d. The inner cylindrical portion 24c extends axially from the outer cylindrical portion 39a via the standing portion 39b. The radially inner portion 24d extends radially inward from the inner cylindrical portion 24c. A sensor holder 36, described below, is insert molded into a region including the outer cylindrical portion 39a and the inner cylindrical portion 24c to integrate it with the metal core 39. The metal core 39 is preferably made of an austenitic stainless steel sheet so that it does not undesirably effect the detecting sensitivity of the wheel speed sensor 29.

The sensor holder 36 is made of non-magnetic resin such as polyphenylene sulfide. A wheel speed detecting sensor 29 is embedded in the resin. The sensor 29 is adapted to be arranged opposite to the magnetic encoder 28, via a predetermined radial air gap. The sensor holder 36 may be formed of injection moldable synthetic resin e.g. PA 66 or polybutylene terephthalate other than resin material described above.

The sensor holder 36 is arranged opposite to the end face of the outer member 3 via a slight axial gap. It is formed with an annular recess 30 so as to expose a portion of the outer circumference of the outer cylindrical portion 39a of the metal core 39. An O-ring 31 is elastically mounted within the recess 30. A disc shaped cover 32 is mounted on the inner side end face of the sensor holder 36. The disc shaped cover 32 includes a central aperture having a smaller diameter than an outer diameter of the slinger 22.

The entire structure of the wheel speed detecting apparatus including the O-ring 31 can be previously assembled. The slinger 22 is press fit into the supporting member 27 of the pulser ring 23 after the sealing plate 38 and the pulser ring 23 have been combined. The outer cylindrical portion 39a of the metal core 39 can be fit into the end of the outer member 3. The cylindrical portion 22a of the slinger 22 can be press-fit onto the smaller diameter portion 6b of the inner ring 6 by axially pushing the entire previously prepared assembly.

An anchoring portion 40 is formed on the standing portion 39b of the metal core 39 forming the sealing plate 38. In this embodiment, since the anchoring portion 40 is formed by a plurality of circular apertures along the circumference of the standing portion 39b, the plastic resin of the sensor holder 36 flows into the circular apertures forming the anchoring portion. Thus, it is possible to assure the adhessiveness or integration between the plastic resin sensor holder and the metal core 39 even though the wheel bearing apparatus is used under severe running circumstances subjected to splashes of muddy water or salty water or repeated of high and low temperature. Accordingly, it is possible to provide a wheel bearing apparatus incorporating a wheel speed detecting apparatus that prevents separation between the sensor holder 36 and the metal core 39 for long term. Also, it prevents detraction of the detecting accuracy caused by the separation between the sensor holder 36 and the metal core 39.

The anchoring portion 40 of the metal core 39 is not limited to the structure shown in FIGS. 4 and 5. It can be formed as a structure shown in FIG. 6. Similarly to the metal core 39 previously described, this metal core 41 is press-formed of an austenitic stainless steel sheet (JIS SUS 304 etc.) or a preserved cold rolled sheet (JIS SPCC etc.). It includes an outer cylindrical portion 39a fit into the end portion of the outer member 3. An inner cylindrical portion 41a extends axially from the outer cylindrical portion 39a, via a standing portion 24b. A radially inner portion 24d extends radially inward from the inner cylindrical portion 41a. The outer cylindrical portion 39a is formed to project from the end of the outer member 3. A sensor holder 36 is insert molded with a region including the outer cylindrical portion 39a, the standing portion and the inner cylindrical portion 41a to be integrated with the metal core 41. An anchoring portion 42, comprising a plurality of circular apertures, is formed along the circumferential direction of the inner cylindrical portion 41a. Synthetic resin, forming the sensor holder 36, flows in the anchoring portion 42 or apertures of the metal core 41. Thus, it is possible to surely prevent separation of the sensor holder 36 and the metal core 41 for a long term.

Figure 7:
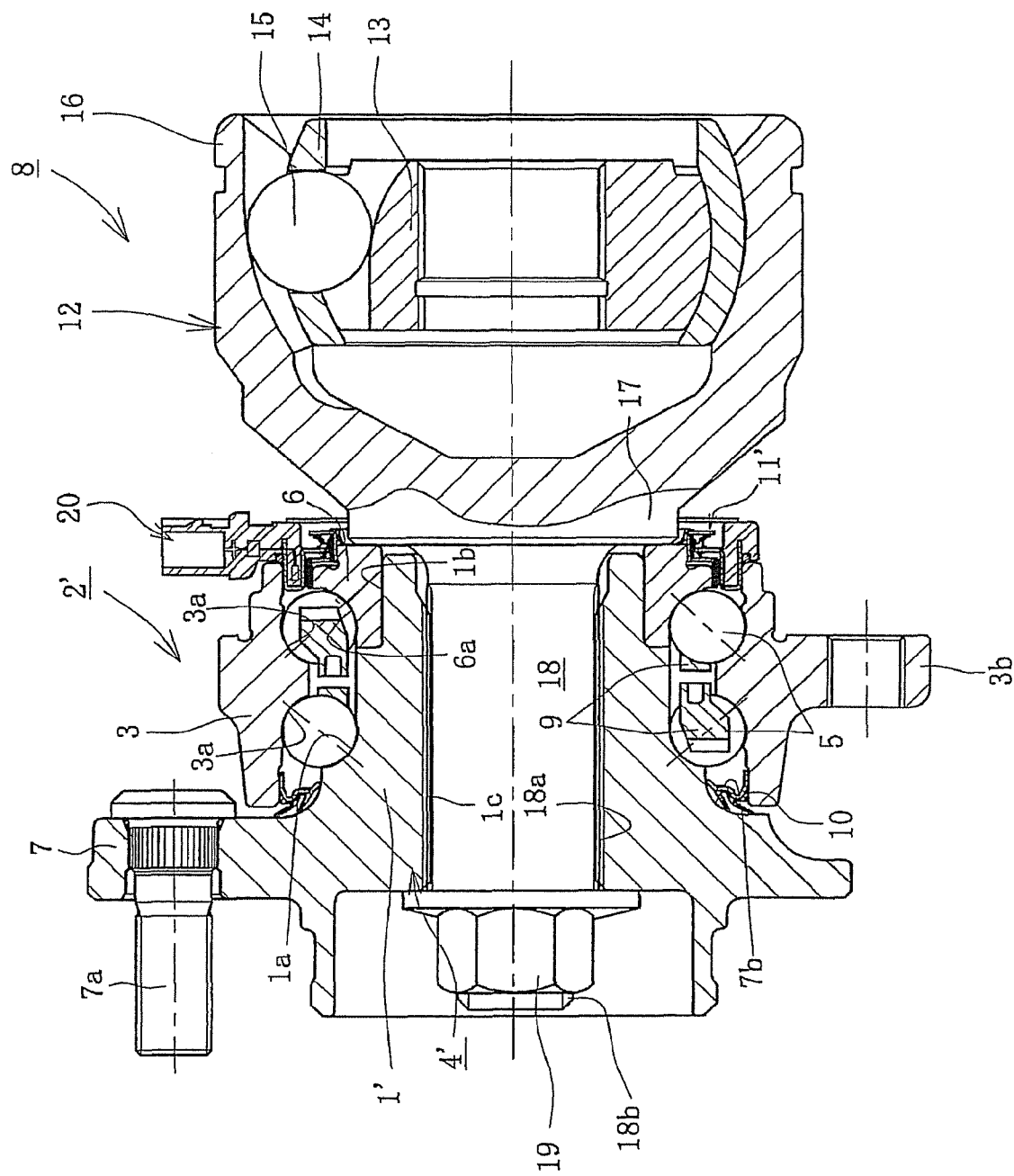
FIG. 7 is a longitudinal section view of a third embodiment of a wheel bearing apparatus incorporating a wheel speed detecting apparatus.
Figure 8:
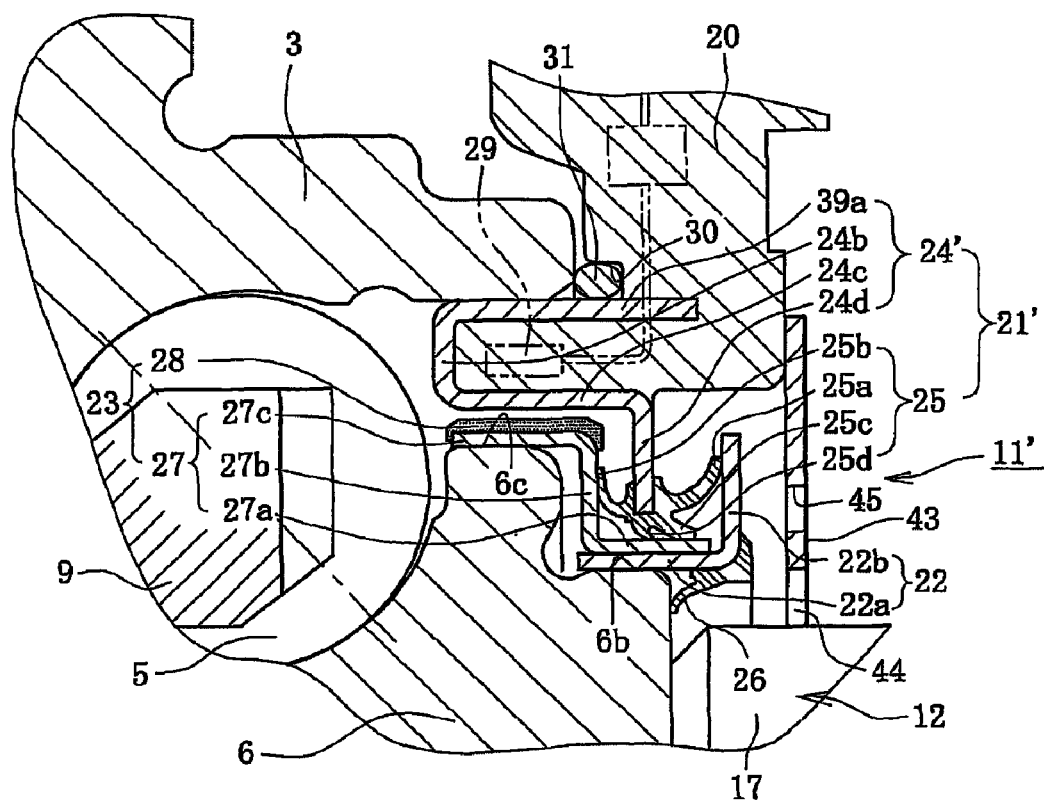
FIG. 8 is a partially enlarged view of FIG. 7.
Figure 9:
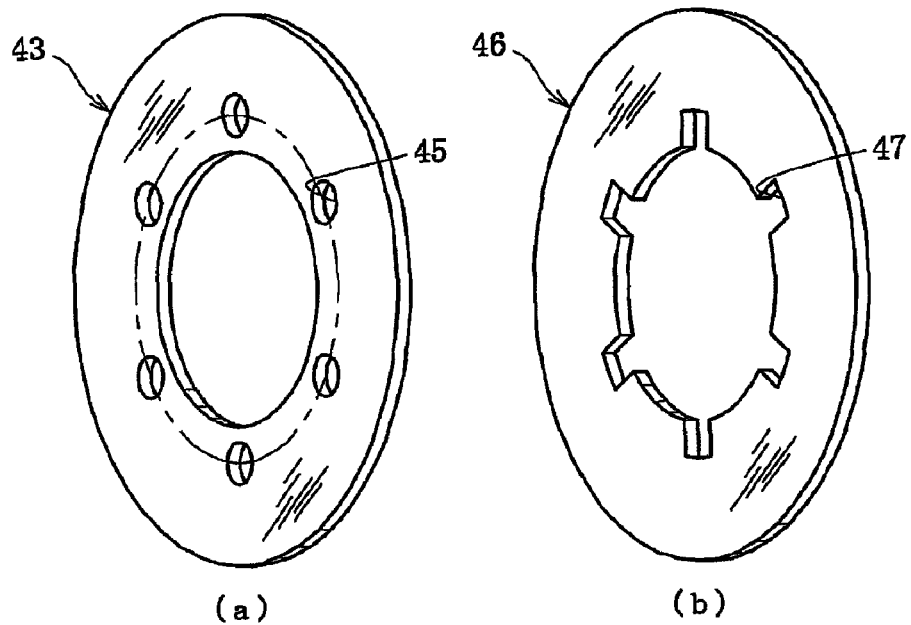
FIG. 9(a) is a perspective view of a disc shaped cover of FIG. 8.
FIG. 9(b) is a perspective view of a modification of FIG. 9(a).

FIG. 7 is a longitudinal section view of a third embodiment of a wheel bearing apparatus incorporating a wheel speed detecting apparatus. FIG. 8 is a partially enlarged view of FIG. 7. FIG. 9(a) is a perspective view of a disc shaped cover of FIG. 8. FIG. 9(b) is a perspective view of a modification of FIG. 9(a). This embodiment is different from the first embodiment (FIG. 1) only in a partial structure of the inner member and a structure of the disc shaped cover. Accordingly, the same reference numerals are used in this embodiment to identify parts or portions having the same functions as those of the first embodiment.

The wheel bearing apparatus incorporating a wheel speed detecting apparatus is a third generation type for a driving wheel and is formed as a unit of a wheel hub 1', a double row rolling bearing 2' and a constant velocity universal joint 8. The double row rolling bearing 2' includes an outer member 3, an inner member 4' and double row rolling elements 5, 5.

The inner member 4' includes the wheel hub 1' and an inner ring 6 secured on the wheel hub 1'. The wheel hub 1' is integrally formed with a wheel mounting flange 7 at one end. The wheel hub outer circumference includes one (outer side) inner raceway surface 1a. A cylindrical portion 1b extends from the inner raceway surface 1a. The wheel hub inner circumference includes, a serration (or spline) 1c for torque transmission.

The wheel hub 1' is made of medium/high carbon steel including carbon of 0.40~0.80% by weight such as S53C. It is hardened by high frequency induction quenching so that the inner raceway surface 1a and a region from a base 7b of the wheel mounting flange 7, forming a seal land of the outer side seal 10, including the inner raceway surface 1a to the cylindrical portion 1b has a hardness of 58~64 HRC. The inner ring 6 is formed on its outer circumference with an inner raceway surface 6a. The inner ring 6 is press-fit onto the cylindrical portion 1b of the wheel hub 1' via a predetermined interference.

The outer joint member 12 is inserted into the wheel hub 1' via the serrations 1c, 18a until the shoulder 17 of the outer joint member 12 abuts against the end face of the inner ring 6. They are detachably united with the wheel hub 1' by fastening a securing nut 19 to an outer thread 18b.

A sensor holder 20 is mounted on the inner side end of the outer member 3. The inner side seal 11' is mounted in an annular opening formed between the sensor holder 20 and the inner ring 6. As shown in FIG. 8, the seal 11' includes an annular sealing plate 21', having a substantially L-shaped cross-section, and a slinger 22. The sealing plate 21' and the slinger 22 are arranged opposite to each other. A pulser ring 23 is fit onto the slinger 22.

The sealing plate 21' includes a metal core 24' and a sealing member 25 integrally bonded to the metal core 24' via vulcanized adhesion. The metal core 24' is press-formed from an austenitic stainless steel sheet (JIS SUS 304 etc.) or a preserved cold rolled sheet (JIS SPCC etc.). The metal core 24 includes an outer cylindrical portion 39a, a standing portion 24b, an inner cylindrical portion 24c and a radially inner portion 24d. The inner cylindrical portion 24c extends axially from the outer cylindrical portion 39a via the standing portion 24b. The radially inner portion 24d extends radially inward from the inner cylindrical portion 24c. The outer cylindrical portion 39a is formed to project from the end of the outer member 3. The sensor holder 20 is insert molded with the metal core 24' and integrally united with it. The metal core 24' is preferably made of an austenitic stainless steel sheet so that it does not undesirably effect the detecting sensitivity of a wheel speed sensor 29, described below.

The sensor holder 20 is arranged opposite to the end face of the outer member 3 via a slight axial gap. The sensor holder 20 is formed with an annular recess 30 so as to expose a portion of the outer circumference of the outer cylindrical portion 39a of the metal core 24'. An O-ring 31 is elastically mounted within the recess 30. A disc shaped cover 43 is mounted on the inner side end face of the sensor holder 20. The cover 43 includes a central aperture having a smaller diameter than an outer diameter of the slinger 22.

The entire structure of the wheel speed detecting apparatus, including the O-ring 31, can be previously assembled. The slinger 22 is press fit into the supporting member 27 of the pulser ring 23 after the sealing plate 21' and the pulser ring 23 have been combined. The outer cylindrical portion 39a of the metal core 24' can be fit into the end of the outer member 3. The cylindrical portion 22a of the slinger 22 can be press-fit onto the smaller diameter portion 6b of the inner ring 6 by axially pushing the entire previously prepared assembly.

A disc shaped cover 43 is press-formed of an austenitic stainless steel sheet (JIS SUS 304 etc.) or a preserved cold rolled sheet (JIS SPCC etc.). The cover 43 is arranged so that a labyrinth seal 44 can be formed relative to the shoulder 17 of the outer joint member 12 via a slight radial gap between the two. As shown in FIG. 9(a), a plurality of drains 45, each including a circular aperture, are formed equidistantly along the inner circumference of the disc shaped cover 43. This prevents entry of muddy water even though the wheel bearing apparatus is used under severe circumstances such as muddy water splashes. Also, it discharges the entered muddy water through the drain. Accordingly, it is possible to provide a wheel bearing apparatus incorporating a wheel speed detecting apparatus that can prevent generation of solidification of muddy water on the slide-contacting portion of the seal. Thus, this prevents the generation of abnormal wear on the sealing member so that sealability and reliability of the bearing apparatus can be assured for a long term.

The disc shaped cover is not limited to that shown in FIG. 9(a). A disc shaped cover 46, shown in FIG. 9(b), can be used. Similar to the disc shaped cover 43, this disc shaped cover 46 is formed of an austenitic stainless steel sheet (JIS SUS 304 etc.) or a preserved cold rolled sheet (JIS SPCC etc.). Cover 46 is formed with a plurality of drains 47 arranged equidistantly along the inner circumferential edge of the cover 46. Similarly to the disc shaped cover 43, the disc shaped cover 46 prevents entry of muddy water even though the wheel bearing apparatus is used under severe circumstances, such as muddy water splashes. Also, it discharges the entered muddy water through the drain.

Figure 10:
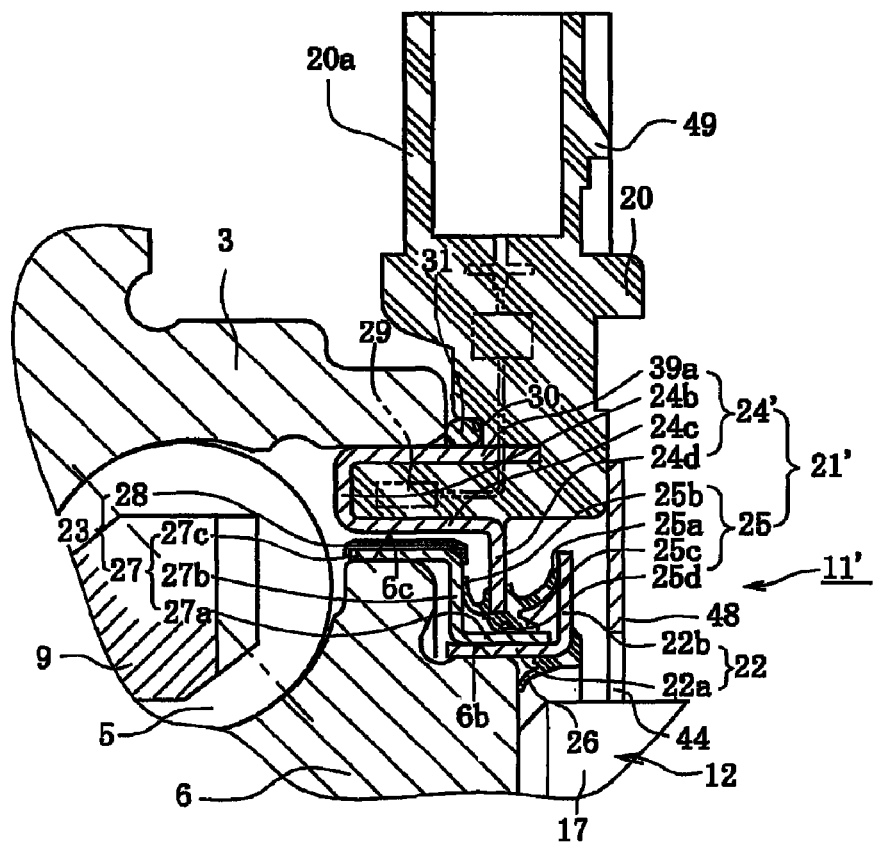
FIG. 10 is a partially enlarged view of a fourth embodiment of a wheel bearing apparatus incorporating a wheel speed detecting apparatus.
Figure 11:
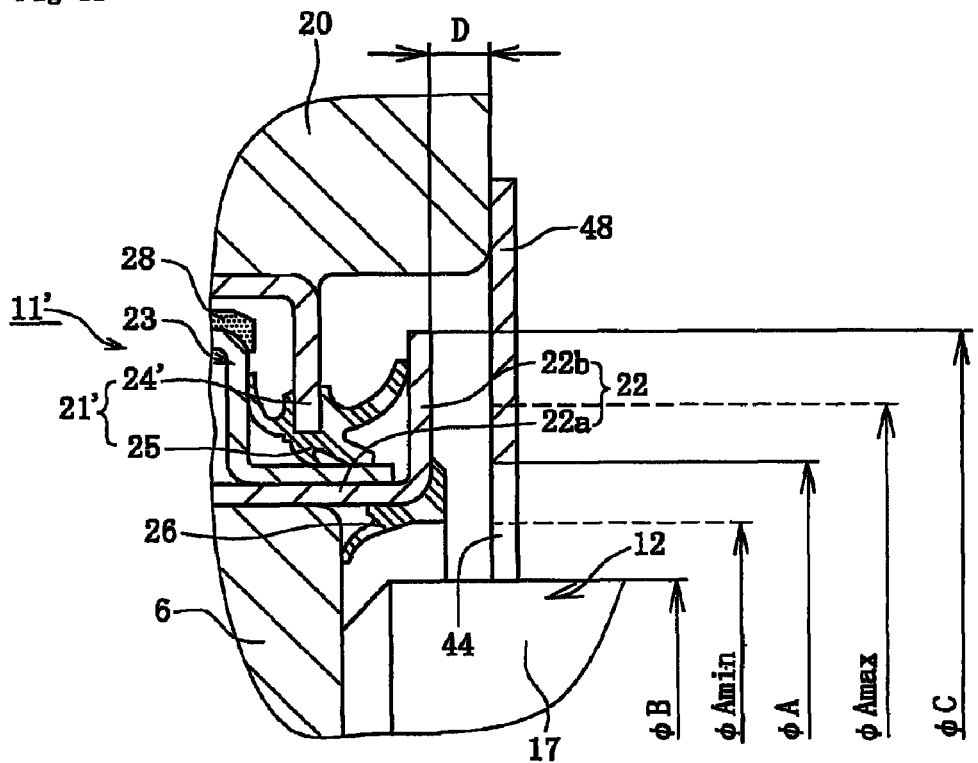
FIG. 11 is an enlarged view of a region near the disc shaped cover.
Figure 12:
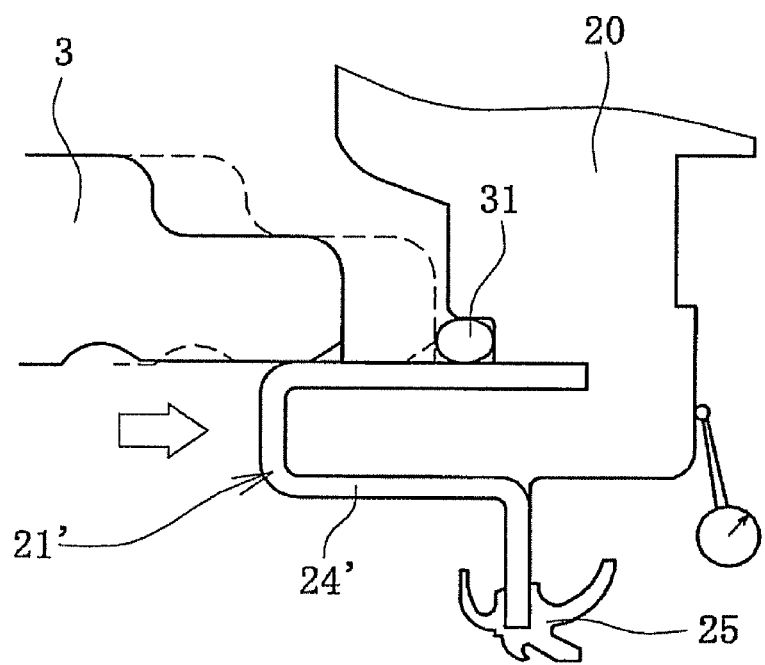
FIG. 12 is an explanatory view of a pull out condition of the sensor holder of FIG. 10.

FIG. 10 is a partially enlarged view of a fourth embodiment of a wheel bearing apparatus incorporating a wheel speed detecting apparatus. FIG. 11 is an enlarged view of a region near the disc shaped cover. FIG. 12 is an explanatory view of a pulling out condition of the sensor holder of FIG. 10. This embodiment is different from the third embodiment (FIG. 8) only in a structure of the disc shaped cover. Accordingly, the same reference numerals are used in this embodiment to identify parts or portions having the same functions as those of the third embodiment.

In this embodiment, the sensor holder 20 is arranged opposite to the end face of the outer member 3 via a slight axial gap. The sensor holder 20 includes an annular recess 30 so as to expose a portion of the outer circumference of the outer cylindrical portion 39a of the metal core 24'. An O-ring 31 is elastically mounted within the recess 30. A disc shaped cover 48 is mounted on the inner side end face of the sensor holder 20. The cover 48 includes a central aperture having a smaller diameter than an outer diameter of the slinger 22.

The disc shaped cover 48 is press-formed of an austenitic stainless steel sheet (JIS SUS 304 etc.) or a preserved cold rolled sheet (JIS SPCC etc.). The cover 48 is arranged so that its inner circumferential edge forms a labyrinth seal 44 relative to the shoulder 17 of the outer joint member 12 via a slight radial gap between the two. In general, the smaller the radial gap of the labyrinth seal, the more effective is the sealability. However, since it is believed that the disc shaped cover 48 would interfere with a rotational member (i.e. shoulder 17 of the outer joint member 12) if the dimensions of the related parts are not strictly limited, the radial gap should be determined in view of the cost effectiveness.

Positional and dimensional relations exist between the disc shaped cover 48 and the slinger 22. A diameter $\phi A$ of the inner circumference of the disc shaped cover 48 is set within a range $\phi B + D \leq \phi A \leq \phi C - D$; wherein $\phi B$ is an outer diameter of the shoulder 17 of the outer joint member 12, $\phi C$ is an outer diameter of the slinger 22, and D is an axial gap between the disc shaped cover 48 and the slinger 22. By setting the diameter $\phi A$ of the inner circumference of the disc shaped cover 48 within the range $\phi B + D \leq \phi A \leq \phi C - D$, a sufficient labyrinth effect can be achieved even when the maximum diameter $\phi A max$ of the inner circumference of the disc shaped cover 48 is $\phi C - D$ (i.e. $\phi A max = \phi C - D$). On the other hand, the interference between the disc shaped cover 48 and the shoulder 17 of the outer joint member 12 can be prevented even when the minimum diameter $\phi A min$ of the inner circumference of the disc shaped cover 48 is $\phi B + D$ (i.e. $\phi A min = \phi B + D$). Accordingly desirable sealability can be effectively assured by this disc shaped cover 48 even when the wheel bearing apparatus is used under severe circumstances subjected not only to rainwater or muddy water but also dusts including pebbles. Thus, it is possible to provide a wheel bearing apparatus incorporating a wheel speed detecting apparatus with high reliability that can stably detect wheel speed for a long term.

In this embodiment, the force required to pull out the sensor holder 20 from the outer member 3 is determined by a predetermined formula. Thus, the fitting interference between the outer member 3 and the metal core 24' is adjusted in accordance with the pull out force determined by the formula. That is, the minimum pull out force Fmin of the metal core 24' against vibration can be determined as Fmin=m×a (N); wherein "m" (kg) is a mass of the sensor holder 20, and "a" (m/sec²) is an acceleration. When the mass (m) of the sensor holder 20 is 0.05 kg, and the acceleration (a) is 30 G, Fmin can be determined as Fmin=0.05×30 G=14.7 N wherein "G" is the gravitational acceleration (=9.80665 m/sec²).

As shown in FIG. 12 the minimum pull out force Fmin of the metal core 24', i.e. the sensor holder 20, is calculated in accordance with conditions of vibration previously loaded on the wheel bearing apparatus and the mass (m) of the sensor holder 20. Accordingly, the anti-pull out force of the sensor holder 20 can be assured without unnecessarily limiting the surface roughness and the dimensional accuracy of the fitting portion only by adjusting the fitting interference between the metal core 24' and the outer member 3. The fitting interference calculated from the pull out force determined, for example, by fitting surface pressure, dimensions of relating parts, finished condition of the fitting surfaces, etc. so that they can satisfy the minimum pull out force Fmin. Thus, it is possible to suppress an increase in machining and management steps and to provide a wheel bearing apparatus incorporating a wheel speed detecting apparatus that improves sealability of the fitting portion and the seal and reliability to maintain the detecting accuracy.

Although it has described above that the anti-pull out force of the sensor holder can be assured by adjusting the fitting interference calculated from the pull out force of the fitting interference between the metal core 24' and the outer member 3, the anti-pull out force can be determined by another way. That is, in this embodiment, a connector portion 20a for mounting a harness (not shown) for connecting the wheel speed sensor 29 and a control means (not shown) mounted on a body of vehicle is integrally molded with an upper portion of the annular sensor holder 20. A plug mounted on one end of a mating harness (not shown) is connected to the connector portion 20a to send output signals from the wheel speed sensor 29 to the control means.

The connector portion 20a is formed with a locking projection 49 that projects axially from the wheel bearing apparatus. The locking projection 49 is formed with an inclined tapered toward a plug inserting direction (upper side of FIG. 10) and a normal portion (lower side of FIG. 10). On the other hand, the mating plug is formed with a recess (not shown) for engaging the locking projection 49 so that the locking projection 49 can be fit into a recess of the plug and locked therein.

An anti-pull out force of the plug from the connector portion 20a is determined at a predetermined value. That is, the anti-pull out force is determined larger than the self-weight of the wheel bearing apparatus, preferably more than three times the self-weight of the wheel bearing apparatus or larger than 30 kg. Thus, the plug will never drop off from the connector portion 20a although the wheel bearing apparatus might be erroneously handled and hung from the connector portion, via the harness, during mounting of the wheel bearing apparatus to a vehicle after the sensor holder has been mounted on the outer member.

The anti-pull out force of the sensor holder 20 from the outer member 3, the anti-pull out force of the outer cylindrical portion 39a of the metal core 24' fit into the outer member 3, may be determined larger than the self-weight of the wheel bearing apparatus. Ordinarily, it is more than three times the weight of the wheel bearing apparatus or larger than 30 kg.

Figure 13:
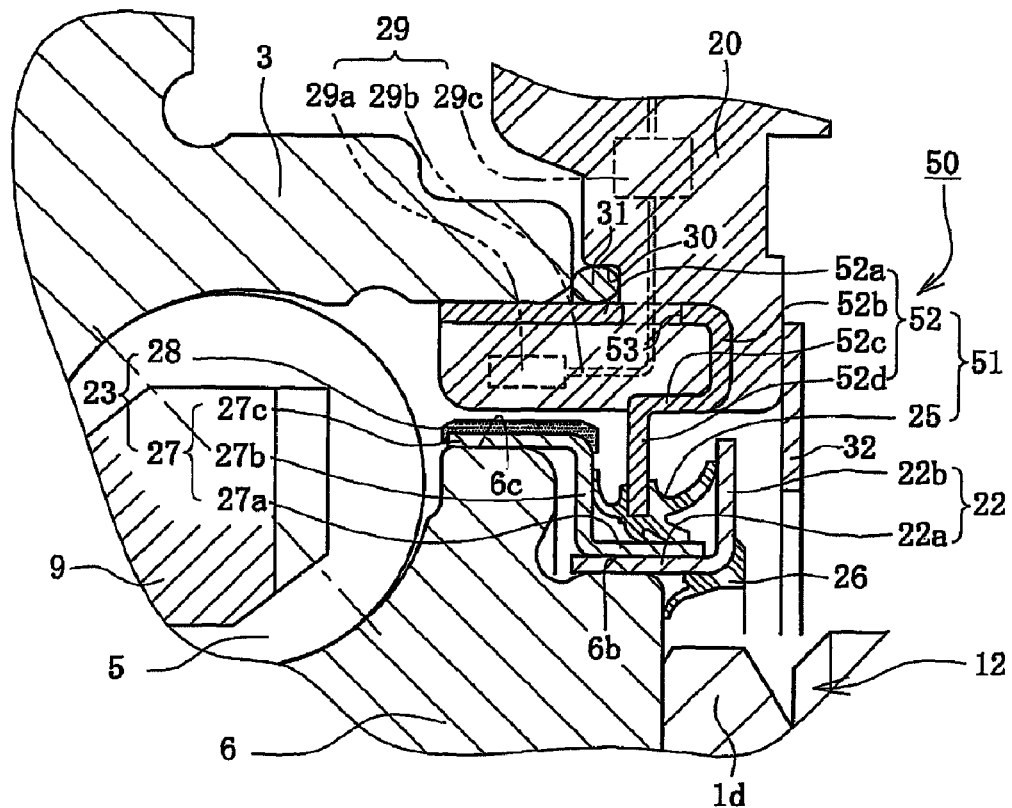
FIG. 13 is a partially enlarged view of a fifth embodiment of a wheel bearing apparatus incorporating a wheel speed detecting apparatus.
Figure 14:
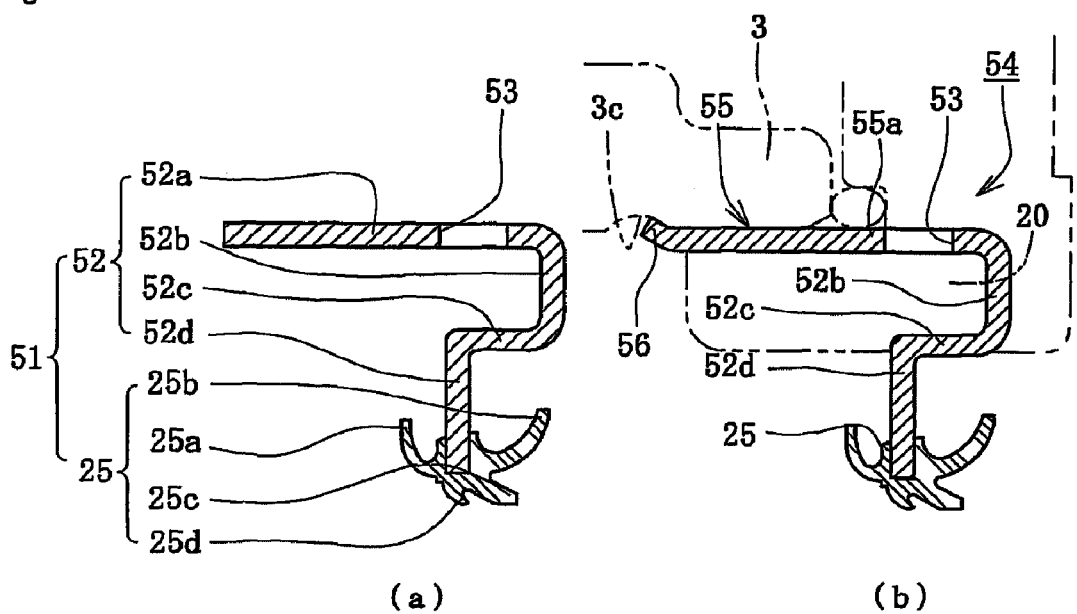
FIG. 14(a) is a cross-sectional view of a sealing plate of FIG. 13.
FIG. 14(b) is a cross-sectional view of a modification of FIG. 14(a).
Figure 15:
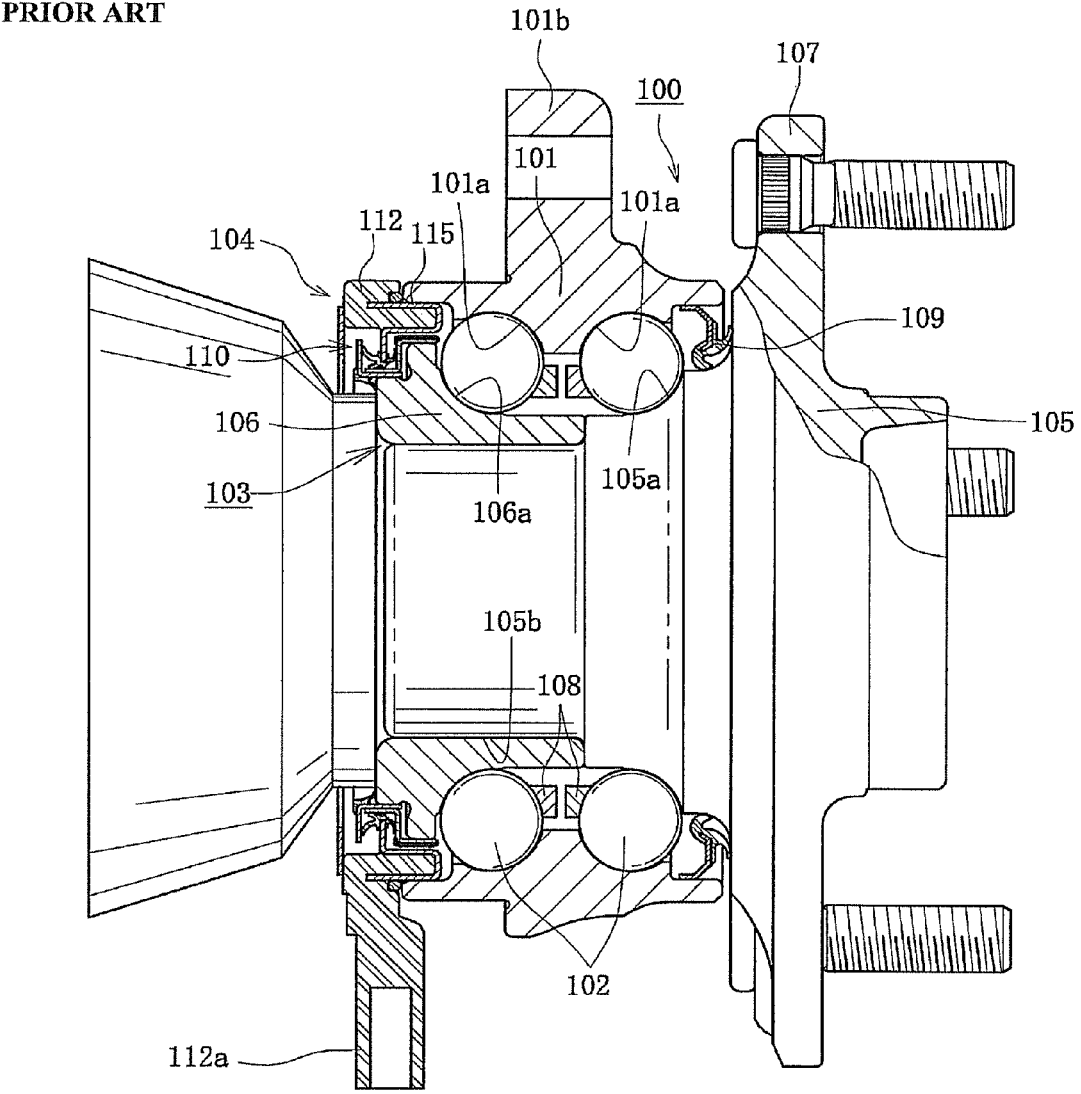
FIG. 15 is a longitudinal section view of a prior art wheel bearing apparatus incorporating a wheel speed detecting apparatus.
Figure 16:
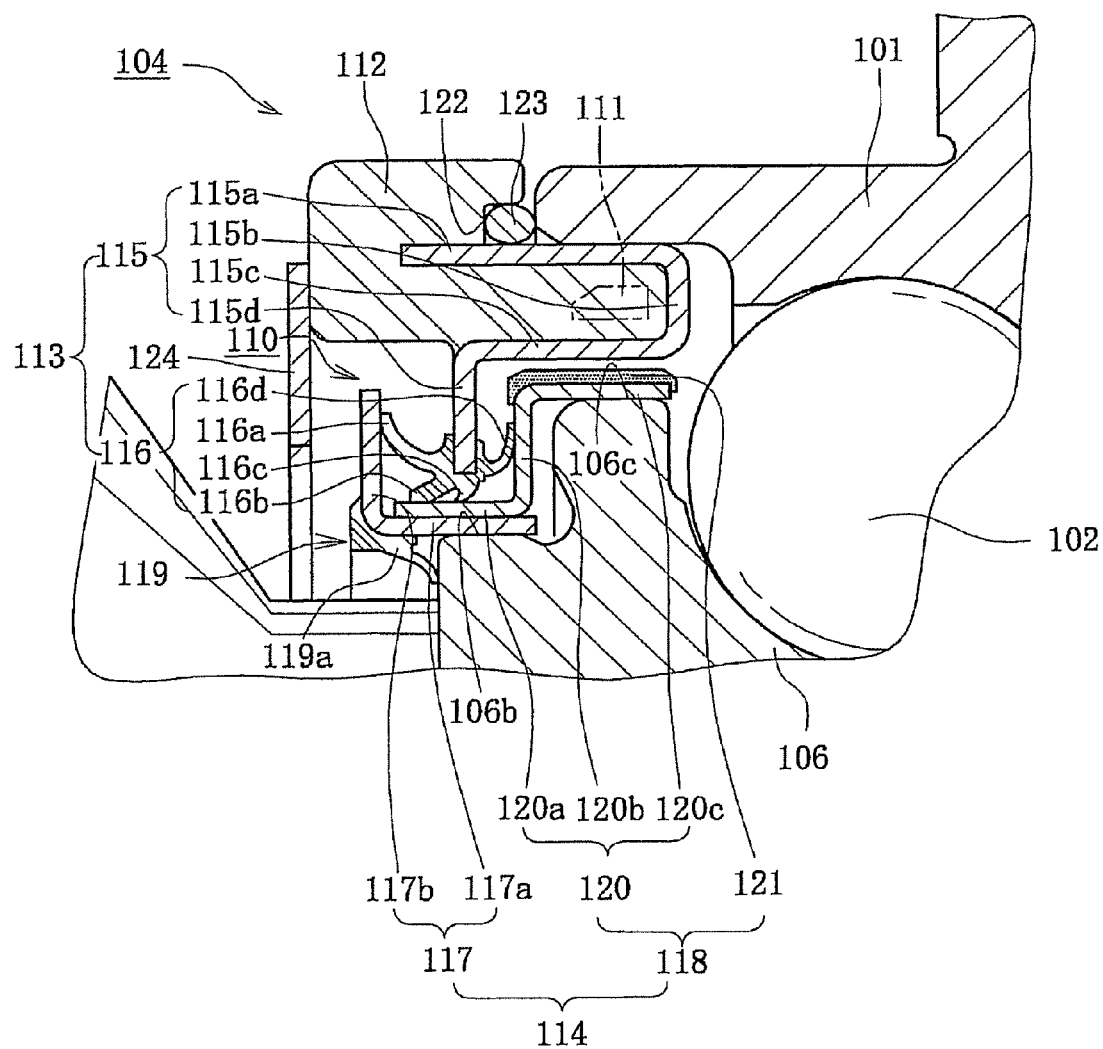
FIG. 16 is a partially enlarged view of FIG. 15.

FIG. 13 is a partially enlarged view of a fifth embodiment of a wheel bearing apparatus incorporating a wheel speed detecting apparatus. FIG. 14(a) is a cross-sectional view of a sealing plate of FIG. 13. FIG. 14(b) is a cross-sectional view of a modification of FIG. 14(a). This embodiment is different from the first embodiment (FIG. 2) only in a structure of the metal core. Accordingly, the same reference numerals are used in this embodiment to identify parts or portions having the same functions as those of the first embodiment.

A sensor holder 20, forming part of the wheel speed detecting apparatus, is mounted on the inner side end of the outer member 3. An inner side seal 50 is mounted in an annular opening formed between the sensor holder 20 and the inner ring 6. The seal 50 includes an annular sealing plate 51, having a substantially L-shaped cross-section, and a slinger 22. The plate 51 and slinger 22 are arranged opposite to each other. A pulser ring 23 is fit onto the slinger 22.

The sealing plate 51 includes a metal core 52 and a sealing member 25 integrally bonded to the metal core 52, via vulcanized adhesion. The metal core 52 is press-formed of an austenitic stainless steel sheet (JIS SUS 304 etc.) or a preserved cold rolled sheet (JIS SPCC etc.). The metal core 52, as shown in FIG. 14(a), includes an outer cylindrical portion 52a, a standing portion 52b, an inner cylindrical portion 52c and a radially inner portion 52d. The inner cylindrical portion 52c extends axially from the outer cylindrical portion 52a via the standing portion 52b. The radially inner portion 52d extends radially inward from the inner cylindrical portion 52c. The sealing member 25 is adhered to the radially inner portion 52d. The outer cylindrical portion 52a is formed to project from the end of the outer member 3. A sensor holder 20 is insert molded with portions of the metal core 52 including the outer cylindrical portion 52a, the standing portion 52b and inner cylindrical portion 52c to be integrated with it. The outer cylindrical portion 52a is formed with a circular aperture 53 for passing a lead wire from the wheel speed sensor 29. The circular aperture 53 is one example and other configuration e.g. a rectangular or square may be adopted.

As described above, the metal core 52 includes the outer cylindrical portion 52a. The standing portion 52b extends radially inward from the inner side end of the outer cylindrical portion 52a. The inner cylindrical portion 52c extends axially from the outer cylindrical portion 52a toward the outer side. The radially inner portion 52d extends radially inward from the inner cylindrical portion 52c. The sensor holder 20 is insert molded with portions of the metal core 52 including the outer cylindrical portion 52a, the standing portion 52b and inner cylindrical portion 52c to be integrated with it. The sealing member 25 is adhered to the radially portion 52d. The radially inner portion 52d is arranged so that it is retracted from the magnetic detecting element (detecting portion) 29a of the wheel speed sensor 29 toward the inner side.

With the adoption of the metal core 52 having such a structure, the wheel speed sensor 29 can magnetically directly oppose the magnetic encoder 28 without any interposition of the metal core of steel plate. Thus, it is possible to remarkably reduce the radial gap (air gap) between the two. Accordingly, it is possible to provide a wheel bearing apparatus incorporating a wheel speed detecting apparatus that obtains a high flux density and improves the detection accuracy and reliability.

A sealing plate 54 shown in FIG. 14(b) is a modification of the sealing plate 51 shown in FIG. 14(a). Here, a portion of the metal core 52 is modified. Similar to the previous metal core 52, the metal core 55 is press-formed of an austenitic stainless steel sheet (JIS SUS 304 etc.) or a preserved cold rolled sheet (JIS SPCC etc.). The metal core 55 includes an outer cylindrical portion 55a, the inner cylindrical portion 52c, extending axially from the outer cylindrical portion 55a via the standing portion 52b, and the radially inner portion 52d, extending radially inward from the inner cylindrical portion 52c.

In this modification the outer side end of the outer cylindrical portion 55a is bent radially outward to form an engaging portion 56. A plurality of circular apertures 53 are formed in the outer cylindrical portion 55a. The engaging portion 56 of the outer cylindrical portion 55a of the metal core 55 engages an annular groove 3c formed on the inner circumference of the end of the outer member 3. During assembly of the sensor holder 20, into the outer member 3, the outer cylindrical portion 55a of the metal core 55 is elastically deformed. The engaging portion 56 of the metal core 55 is snapped into the annular groove 3c. Thus, the metal core 55 is securely press-fit into the outer member 3. Accordingly, it is possible to prevent displacement of the metal core 55 relative to the outer member 3. Also, displacement of the detecting portion is prevented even if vibration or shock is applied to the bearing during running of the vehicle. Thus, this maintains stable detecting accuracy for a long term.

In addition, the provision of the plurality of circular apertures 53 in the outer cylindrical portion of the metal core 55 makes it possible to efficiently perform the wiring operation. Also, it assures the integral bonding between the sensor holder 20 and the metal core 55. Thus, this prevents separation of the insert molded sensor holder 20 from the metal core 55 even though the wheel bearing apparatus is used under severe circumstances including splashes of muddy or salty water or repeated high and low temperatures.

According to this embodiment, the provision of the circular apertures 53 for passing the lead wire 29b makes it possible to connect the magnetic detecting element 29a and an IC 29c at a shortest distance without bypassing the metal core. Thus, this improves the reliability of the wheel speed sensor 29. In addition, plastic resin, forming the sensor holder 20, flows into the apertures 53 and firmly grips the metal core 52 (55) after the IC 29c and the harness (not shown) have been connected. Thus, it is possible to prevent separation of the insert molded sensor holder 20 from the metal core 52 (55) for a long term even though the wheel bearing apparatus is used under severe circumstances including splashes of muddy or salty water or repeated high and low temperatures.

The wheel bearing apparatus incorporating a wheel speed detecting apparatus can be applied to a wheel bearing apparatus provided with any type of wheel speed detecting apparatus.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus incorporating a wheel speed detecting apparatus comprising:
    an outer member integrally formed with a body mounting flange on its outer circumference, said body mounting flange to be mounted on a suspension apparatus of a vehicle, and said outer member inner circumference includes double row outer raceway surfaces;
    an inner member including a wheel hub and at least one inner ring, the wheel hub having, at one end, an integrally formed wheel mounting flange, said wheel hub outer circumference including an inner raceway surface, a cylindrical portion axially extending from the inner raceway surface, the inner ring being fit onto the cylindrical portion of the wheel hub, the inner ring being formed with another inner raceway surface on its outer circumference, the another inner raceway surfaces arranged opposite to the double row outer raceway surfaces;
    double row rolling elements are freely rollably contained between the inner and outer raceway surfaces, respectively, of the inner member and the outer member;
    seals are mounted in annular openings formed between the outer member and the inner member;
    a sensor holder is injection molded from a synthetic resin, the wheel speed detecting sensor is embedded in said sensor holder, said sensor holder is mounted on an inner side end of the outer member;
    an inner side seal of the seals including an annular sealing plate, a slinger and a pulser ring, the slinger has a substantially L-shaped cross-section and is mounted onto the outer circumference of the inner ring, the pulser ring is fit onto the outer circumference of the slinger, the pulser ring includes a magnetic encoder with circumferential characteristics that alternately and equidistantly change;
    the sealing plate includes a metal core press formed from a steel plate, the sealing plate is insert molded into the sensor holder and includes an exposed portion of the metal core that is into the end portion of the outer member, a sealing member is integrally bonded to the metal core, the seal member has integrally formed side lips and radial lips;
    the side lips of the sealing member are in sliding contact with the slinger and/or the pulser ring;
    the magnetic encoder and a wheel speed sensor are arranged opposite each other via a radial gap;
    an anchoring portion is integrally formed with the metal core and the sensor holder integrally molded with the metal core from synthetic resin surrounding the anchoring portion; and
    a plurality of circular apertures is formed in an outer cylindrical portion of the metal core along its circumference.

2. The wheel bearing apparatus incorporating the wheel speed detecting apparatus of claim 1, wherein the metal core includes an outer cylindrical portion press-fit into the end portion of the outer member, a standing portion extends radially inward from the outer cylindrical portion, an inner cylindrical portion axially extends toward the inner side, and a radially inner portion extends radially inward from the inner cylindrical portion, the sealing member is integrally adhered to the radially inner portion, and the anchoring portion is a tongue formed by folding an end portion of the outer cylindrical portion radially outward.

3. The wheel bearing apparatus incorporating the wheel speed detecting apparatus of claim 1, wherein the inner ring is formed with a smaller diameter portion and a larger diameter portion, a cylindrical portion of the slinger is press-fit onto the smaller diameter portion of the inner ring, the pulser ring includes a supporting member and the magnetic encoder, the supporting member is press-formed from ferromagnetic steel plate and includes an inner cylindrical portion press-fit onto the cylindrical portion of the slinger, a standing portion extending radially outward from the inner cylindrical portion, and an outer cylindrical portion, formed with a slightly larger diameter than the larger diameter portion of the inner ring, has the magnetic encoder adhered to the outer cylindrical portion of the supporting member, the magnetic encoder is formed from an elastomer mingled with magnetic powder, the encoder has N and S poles alternately arranged along its circumference, the encoder is arranged opposite to the wheel speed sensor via a radial gap relative to the inner cylindrical portion of the metal core without contact.

4. The wheel bearing apparatus incorporating the wheel speed detecting apparatus of claim 3, wherein the supporting member is press-formed from ferromagnetic steel plate and the magnetic encoder is formed from an elastomer mingled with magnetic powder, the magnetic encoder has N and S poles alternately arranged along its circumference.

5. The wheel bearing apparatus incorporating the wheel speed detecting apparatus of claim 1, wherein the metal core is made of austenitic stainless steel.

6. The wheel bearing apparatus incorporating the wheel speed detecting apparatus of claim 1, wherein the minimum anti-pull out force of the sensor holder relative to the outer member is defined by a formula Fmin=m×a; wherein "m" is mass of the sensor holder, and "a" is a vibration acceleration, and the anti-pull out force of the sensor holder is set at Fmin or more.

7. The wheel bearing apparatus incorporating the wheel speed detecting apparatus of claim 6, wherein the fitting interface between the outer member and the metal core is adjustable based on the anti-pull out force of the sensor holder.

8. The wheel bearing apparatus incorporating the wheel speed detecting apparatus of claim 1, wherein a connector portion is integrally formed with a portion of the sensor holder for mounting a harness connecting a control means, mounted on a body of a vehicle, and the magnetic sensor, an output signal from the magnet sensor can be sent to the control means via a plug inserted into the connector portion, and the anti-pull out force of the sensor holder relative to the connector portion and the plug and relative to the outer member is set larger than the self-weight of the wheel bearing apparatus.

9. The wheel bearing apparatus incorporating the wheel speed detecting apparatus of claim 8, wherein the connector portion is formed with a locking projection projecting axially from the wheel bearing apparatus, and the locking projection is formed with an inclined taper toward a plug inserting direction so that the locking projection can be fit into a recess formed in the plug and locked therein.

10. A wheel bearing apparatus incorporating a wheel speed detecting apparatus comprising:
  an outer member integrally formed with a body mounting flange on its outer circumference, said body mounting flange to be mounted on a suspension apparatus of a vehicle, and said outer member inner circumference includes double row outer raceway surfaces;
  an inner member including a wheel hub and at least one inner ring, the wheel hub having, at one end, an integrally formed wheel mounting flange, said wheel hub outer circumference including an inner raceway surface, a cylindrical portion axially extending from the inner raceway surface, the inner ring being fit onto the cylindrical portion of the wheel hub, the inner ring being formed with another inner raceway surface on its outer circumference, the another inner raceway surfaces arranged opposite to the double row outer raceway surfaces;
  double row rolling elements are freely rollably contained between the inner and outer raceway surfaces, respectively, of the inner member and the outer member;
  seals are mounted in annular openings formed between the outer member and the inner member;
  a sensor holder is injection molded from a synthetic resin, the wheel speed detecting sensor is embedded in said sensor holder, said sensor holder is mounted on an inner side end of the outer member;
  an inner side seal of the seals including an annular sealing plate, a slinger and a pulser ring, the slinger has a substantially L-shaped cross-section and is mounted onto the outer circumference of the inner ring, the pulser ring is fit onto the outer circumference of the slinger, the pulser ring includes a magnetic encoder with circumferential characteristics that alternately and equidistantly change;
  the sealing plate includes a metal core press formed from a steel plate, the sealing plate is insert molded into the sensor holder and includes an exposed portion of the metal core that is into the end portion of the outer member, a sealing member is integrally bonded to the metal core, the seal member has integrally formed side lips and radial lips;
  the side lips of the sealing member are in sliding contact with the slinger and/or the pulser ring;
  the magnetic encoder and a wheel speed sensor are arranged opposite each other via a radial gap;
  an anchoring portion is integrally formed with the metal core and the sensor holder integrally molded with the metal core from synthetic resin surrounding the anchoring portion; and
  a plurality of circular aperture is formed in a standing portion of the metal core along its circumference.

11. The wheel bearing apparatus incorporating the wheel speed detecting apparatus of claim 10, wherein the metal core includes an outer cylindrical portion press-fit into the end portion of the outer member, a standing portion extends radially inward from the outer cylindrical portion, an inner cylindrical portion axially extends toward the inner side, and a radially inner portion extends radially inward from the inner cylindrical portion, the sealing member is integrally adhered to the radially inner portion, and the anchoring portion is a tongue formed by folding an end portion of the outer cylindrical portion radially outward.

12. The wheel bearing apparatus incorporating the wheel speed detecting apparatus of claim 10, wherein the inner ring is formed with a smaller diameter portion and a larger diameter portion, a cylindrical portion of the slinger is press-fit onto the smaller diameter portion of the inner ring, the pulser ring includes a supporting member and the magnetic encoder, the supporting member is press-formed from ferromagnetic steel plate and includes an inner cylindrical portion press-fit onto the cylindrical portion of the slinger, a standing portion extending radially outward from the inner cylindrical portion, and an outer cylindrical portion, formed with a slightly larger diameter than the larger diameter portion of the inner ring, has the magnetic encoder adhered to the outer cylindrical portion of the supporting member, the magnetic encoder is formed from an elastomer mingled with magnetic powder, the encoder has N and S poles alternately arranged along its circumference, the encoder is arranged opposite to the wheel speed sensor via a radial gap relative to the inner cylindrical portion of the metal core without contact.

13. The wheel bearing apparatus incorporating the wheel speed detecting apparatus of claim 10, wherein the minimum anti-pull out force of the sensor holder relative to the outer member is defined by a formula $Fmin = m \times a$; wherein "m" is mass of the sensor holder, and "a" is a vibration acceleration, and the anti-pull out force of the sensor holder is set at Fmin or more.

14. The wheel bearing apparatus incorporating the wheel speed detecting apparatus of claim 10, wherein a connector portion is integrally formed with a portion of the sensor holder for mounting a harness connecting a control means, mounted on a body of a vehicle, and the magnetic sensor, an output signal from the magnet sensor can be sent to the control means via a plug inserted into the connector portion, and the anti-pull out force of the sensor holder relative to the connector portion and the plug and relative to the outer member is set larger than the self-weight of the wheel bearing apparatus.

15. A wheel bearing apparatus incorporating a wheel speed detecting apparatus comprising:
  an outer member integrally formed with a body mounting flange on its outer circumference, said body mounting flange to be mounted on a suspension apparatus of a vehicle, and said outer member inner circumference includes double row outer raceway surfaces;
  an inner member including a wheel hub and at least one inner ring, the wheel hub having, at one end, an integrally formed wheel mounting flange, said wheel hub outer circumference including an inner raceway surface, a cylindrical portion axially extending from the inner raceway surface, the inner ring being fit onto the cylindrical portion of the wheel hub, the inner ring being formed with another inner raceway surface on its outer circumference, the another inner raceway surfaces arranged opposite to the double row outer raceway surfaces;
  double row rolling elements are freely rollably contained between the inner and outer raceway surfaces, respectively, of the inner member and the outer member;
  seals are mounted in annular openings formed between the outer member and the inner member;
  a sensor holder is injection molded from a synthetic resin, the wheel speed detecting sensor is embedded in said sensor holder, said sensor holder is mounted on an inner side end of the outer member;
  an inner side seal of the seals including an annular sealing plate, a slinger and a pulser ring, the slinger has a substantially L-shaped cross-section and is mounted onto the outer circumference of the inner ring, the pulser ring is fit onto the outer circumference of the slinger, the pulser ring includes a magnetic encoder with circumferential characteristics that alternately and equidistantly change;

the sealing plate includes a metal core press formed from a steel plate, the sealing plate is insert molded into the sensor holder and includes an exposed portion of the metal core that is into the end portion of the outer member, a sealing member is integrally bonded to the metal core, the seal member has integrally formed side lips and radial lips;

the side lips of the sealing member are in sliding contact with the slinger and/or the pulser ring;

the magnetic encoder and a wheel speed sensor are arranged opposite each other via a radial gap;

an anchoring portion is integrally formed with the metal core and the sensor holder integrally molded with the metal core from synthetic resin surrounding the anchoring portion; and a disc shaped cover is arranged at the inner side of the sensor holder, an inner circumference of the disc shaped cover is arranged opposite to the outer circumference of a shoulder of an outer joint member via a small radial gap to form a labyrinth seal therebetween, and drains are formed on or near the inner circumference of the disc shaped cover.

16. The wheel bearing apparatus incorporating the wheel speed detecting apparatus of claim 15, wherein the drains are circular apertures formed equidistantly along the inner circumference of the disc shaped cover.

17. The wheel bearing apparatus incorporating the wheel speed detecting apparatus of claim 15 wherein the drains are notches formed equidistantly along the inner circumference of the disc shaped cover.

18. The wheel bearing apparatus incorporating the wheel speed detecting apparatus of claim 15 wherein a diameter A of the inner circumference of the disc shaped cover is set within a range B+D≦A≦C−D; wherein B is an outer diameter of the shoulder of the outer joint member, C is an outer diameter of the slinger, and D is an axial gap between the disc shaped cover and the slinger.

19. The wheel bearing apparatus incorporating the wheel speed detecting apparatus of claim 18 wherein the shoulder abuts against a larger end face of the inner ring, the outer diameter of the shoulder is set smaller than that of the inner ring, and wherein an elastic lip is integrally adhered to the slinger and contacts the end face of the inner ring.

20. The wheel bearing apparatus incorporating the wheel speed detecting apparatus of claim 15, wherein the slinger and the disc shaped cover are press-formed from steel plate material with preserving ability.

21. A wheel bearing apparatus incorporating a wheel speed detecting apparatus comprising:

an outer member integrally formed with a body mounting flange on its outer circumference, said body mounting flange to be mounted on a suspension apparatus of a vehicle, and said outer member inner circumference includes double row outer raceway surfaces;

an inner member including a wheel hub and at least one inner ring, the wheel hub having, at one end, an integrally formed wheel mounting flange, said wheel hub outer circumference including an inner raceway surface, a cylindrical portion axially extending from the inner raceway surface, the inner ring being fit onto the cylindrical portion of the wheel hub, the inner ring being formed with another inner raceway surface on its outer circumference, the another inner raceway surfaces arranged opposite to the double row outer raceway surfaces;

double row rolling elements are freely rollably contained between the inner and outer raceway surfaces, respectively, of the inner member and the outer member;

seals are mounted in annular openings formed between the outer member and the inner member;

a sensor holder is injection molded from a synthetic resin, the wheel speed detecting sensor is embedded in said sensor holder, said sensor holder is mounted on an inner side end of the outer member;

an inner side seal of the seals including an annular sealing plate, a slinger and a pulser ring, the slinger has a substantially L-shaped cross-section and is mounted onto the outer circumference of the inner ring, the pulser ring is fit onto the outer circumference of the slinger, the pulser ring includes a magnetic encoder with circumferential characteristics that alternately and equidistantly change;

the sealing plate includes a metal core press formed from a steel plate, the sealing plate is insert molded into the sensor holder and includes an exposed portion of the metal core that is into the end portion of the outer member, a sealing member is integrally bonded to the metal core, the seal member has integrally formed side lips and radial lips;

the side lips of the sealing member are in sliding contact with the slinger and/or the pulser ring;

the magnetic encoder and a wheel speed sensor are arranged opposite each other via a radial gap;

an anchoring portion is integrally formed with the metal core and the sensor holder integrally molded with the metal core from synthetic resin surrounding the anchoring portion; and the metal core includes an outer cylindrical portion press-fit into the end portion of the outer member, a standing portion extending radially inward from the inner side end of the outer cylindrical portion, an inner cylindrical portion axially extending toward the outer side from the standing portion, and a radially inner portion extending radially inward from the inner cylindrical portion, the sensor holder is integrated with the metal core and is insert molded in a region including the outer cylindrical portion, the standing portion and the inner cylindrical portion, and the sealing member is adhered to the radially inner portion and is arranged to the inner side from the detecting portion of the wheel speed sensor.

22. The wheel bearing apparatus incorporating the wheel speed detecting apparatus of claim 21, wherein the magnetic encoder is formed of an elastomer such as a rubber magnet mingled with magnetic powder, the magnetic encoder has N and S poles alternately arranged along its circumference, the wheel speed sensor includes a magnetic detecting element, varying its characteristics in accordance with the flow direction of magnetic flux, and an IC, the IC is incorporated, via a lead wire, with a wave forming circuit for rectifying the output wave form of the magnetic detecting element, and an aperture enabling passage of the lead wire is formed in the outer cylindrical portion of the metal core.

23. The wheel bearing apparatus incorporating the wheel speed detecting apparatus of claim 21, wherein a plurality of apertures is formed in the outer cylindrical portion of the metal core.

24. The wheel bearing apparatus incorporating the wheel speed detecting apparatus of claim 21, wherein the sensor holder is formed of non-magnetic synthetic resin.

25. The wheel bearing apparatus incorporating the wheel speed detecting apparatus of claim 21, wherein an annular groove is formed on the inner circumferential surface at the inner side end of the outer member, and a radially outwardly deformed engaging portion is formed at the outer side end of the outer cylindrical portion of the metal core so that the engaging portion is fit in the annular groove.

* * * * *

UNITED STATES PATENT AND TRADEMARK OFFICE
CERTIFICATE OF CORRECTION

PATENT NO.        : 8,360,649 B2
APPLICATION NO.   : 12/618982
DATED             : January 29, 2013
INVENTOR(S)       : Takayuki Norimatsu et al.

It is certified that error appears in the above-identified patent and that said Letters Patent is hereby corrected as shown below:

In the Claims

Column 23
Line 55, claim 10 "circular aperture" should be --circular apertures--

Signed and Sealed this
Thirtieth Day of July, 2013

Teresa Stanek Rea
*Acting Director of the United States Patent and Trademark Office*